Sept. 10, 1957   C. W. MUSSER   2,805,603
GUN AIMING MECHANISM WITH ASSOCIATED TRIGGER RELEASE
MECHANISM AND SUPPORTING MOUNT
Filed Feb. 24, 1953   15 Sheets-Sheet 2

INVENTOR.
C WALTON MUSSER
BY H. E. Thibodeau, A. W. Dew
and H. I. Forman
ATTORNEYS:

INVENTOR.
C WALTON MUSSER

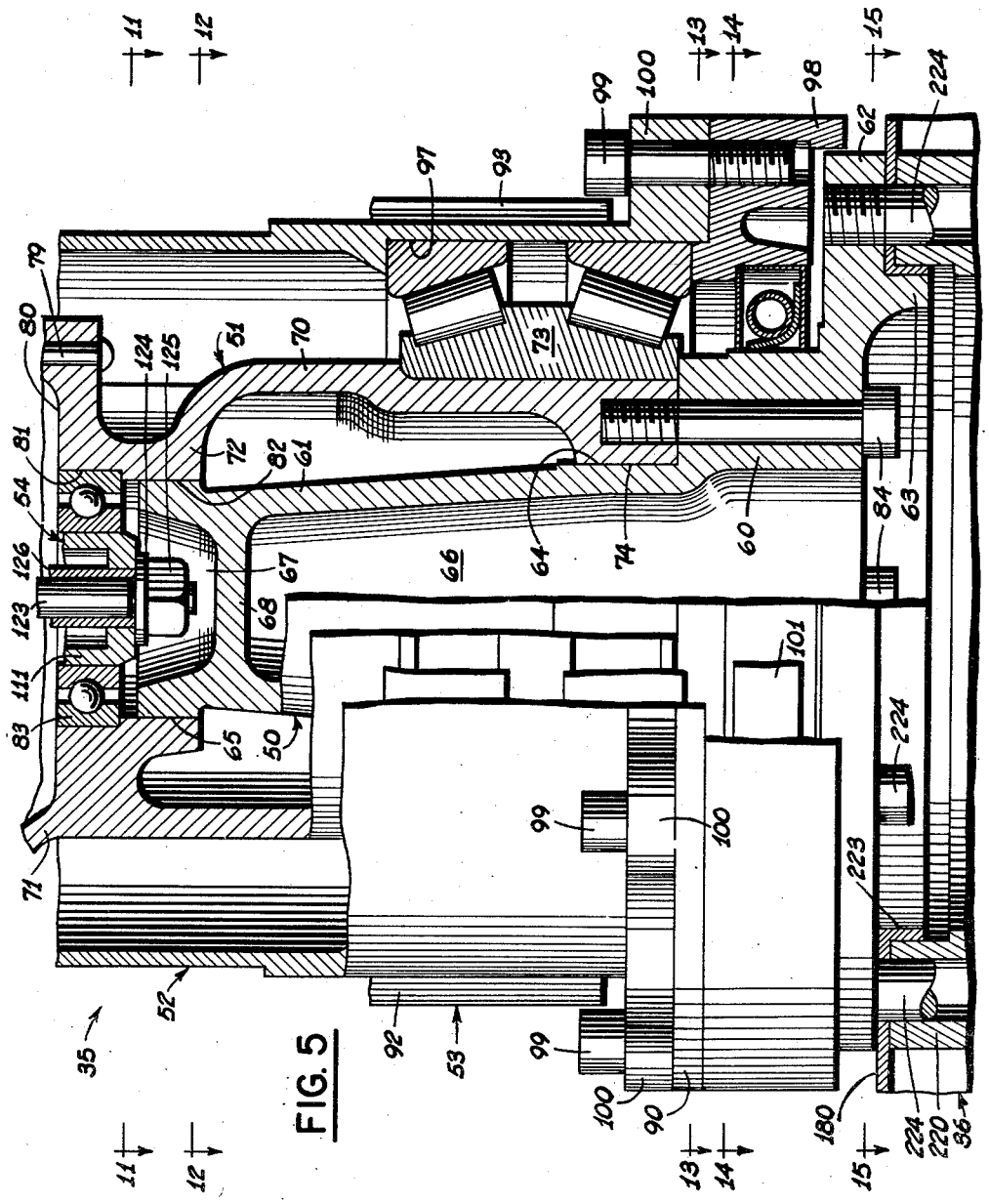

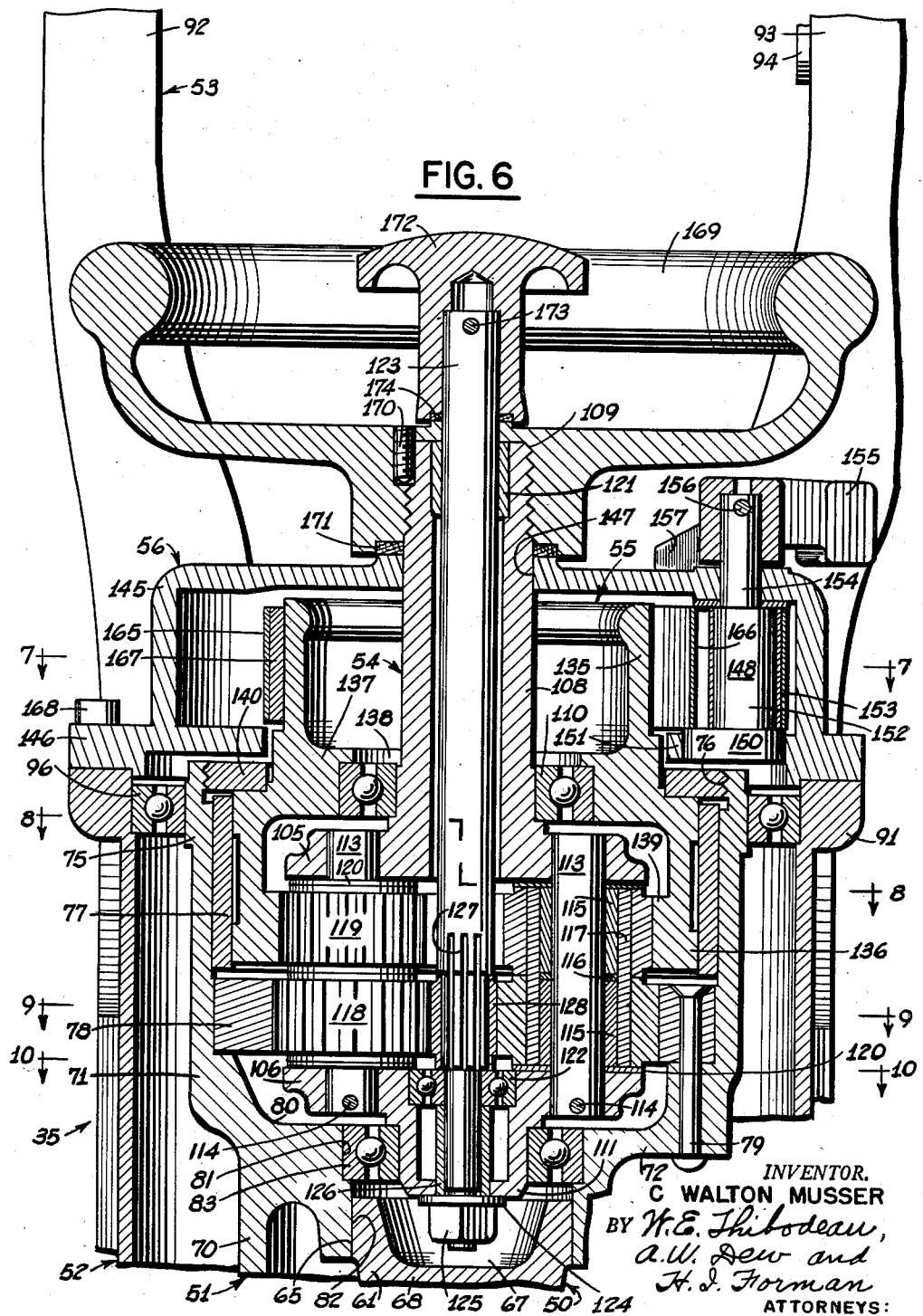

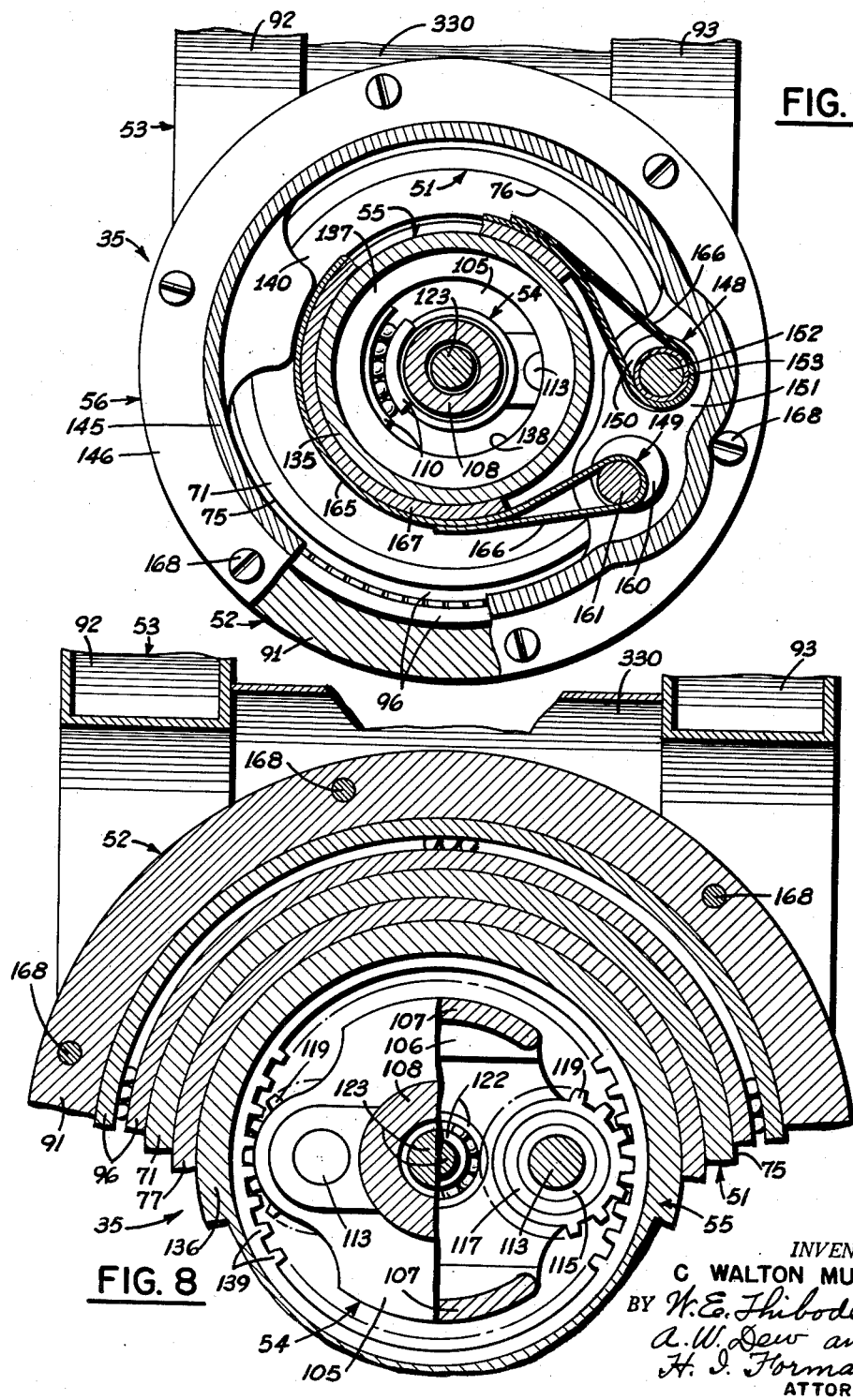

Sept. 10, 1957 C. W. MUSSER 2,805,603
GUN AIMING MECHANISM WITH ASSOCIATED TRIGGER RELEASE
MECHANISM AND SUPPORTING MOUNT
Filed Feb. 24, 1953 15 Sheets-Sheet 7

INVENTOR.
C WALTON MUSSER
BY
W. E. Thibodeau, A. W. Dew
and H. I. Forman
ATTORNEYS Sept. 10, 1957 C W. MUSSER 2,805,603
GUN AIMING MECHANISM WITH ASSOCIATED TRIGGER RELEASE
MECHANISM AND SUPPORTING MOUNT
Filed Feb. 24, 1953 15 Sheets-Sheet 10

INVENTOR.
C WALTON MUSSER
BY
W.E. Thibodeau, A.W. Dew
and H.J. Forman
ATTORNEYS:

INVENTOR.
C WALTON MUSSER
BY W. E. Thibodeau,
A. W. Dew and
H. I. Forman
ATTORNEYS:

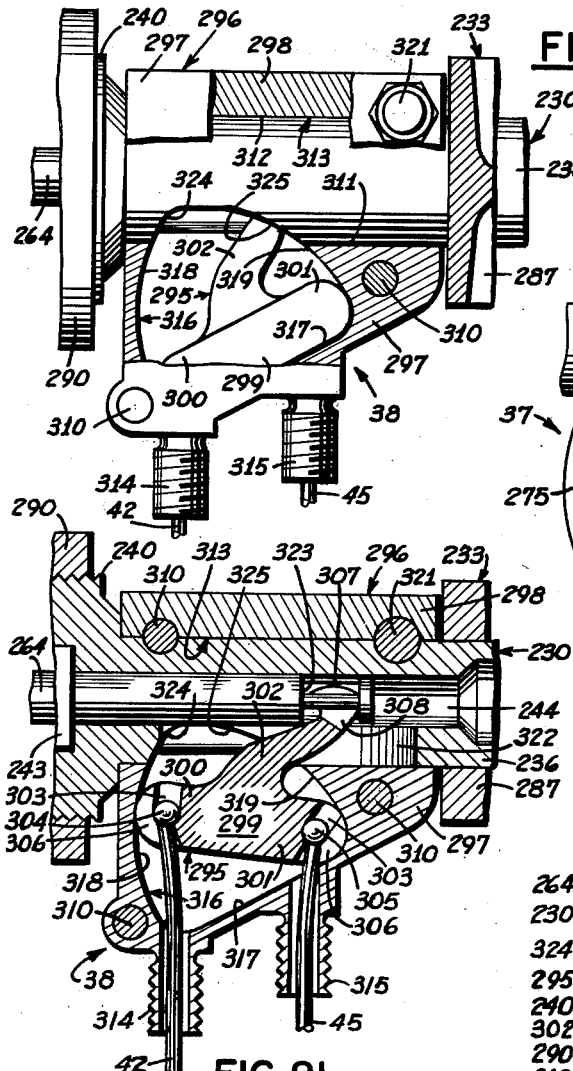
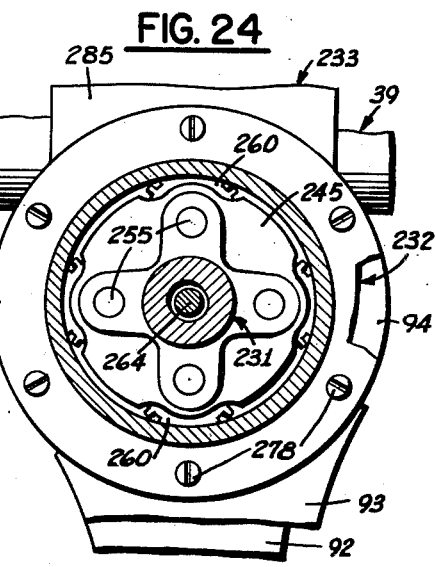
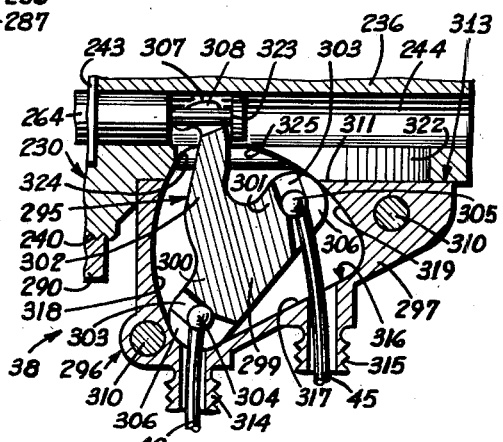
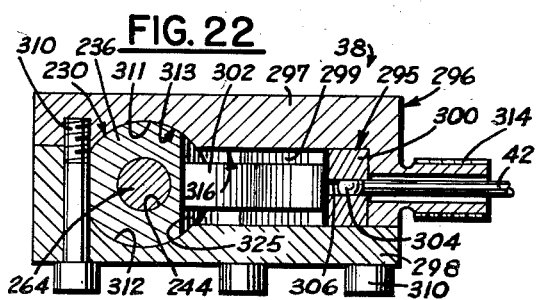

Sept. 10, 1957 C W. MUSSER 2,805,603
GUN AIMING MECHANISM WITH ASSOCIATED TRIGGER RELEASE
MECHANISM AND SUPPORTING MOUNT
Filed Feb. 24, 1953 15 Sheets-Sheet 13

INVENTOR.
C WALTON MUSSER
BY W. E. Thibodeau,
A. W. Dew and
H. J. Forman
ATTORNEYS

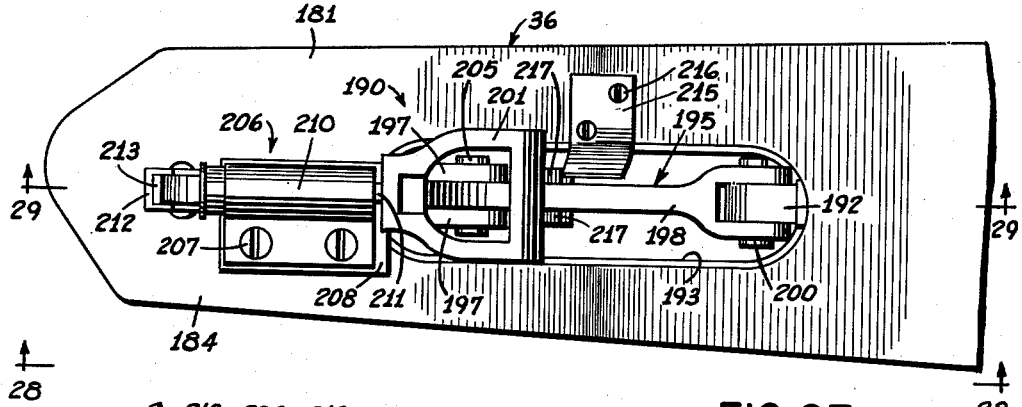
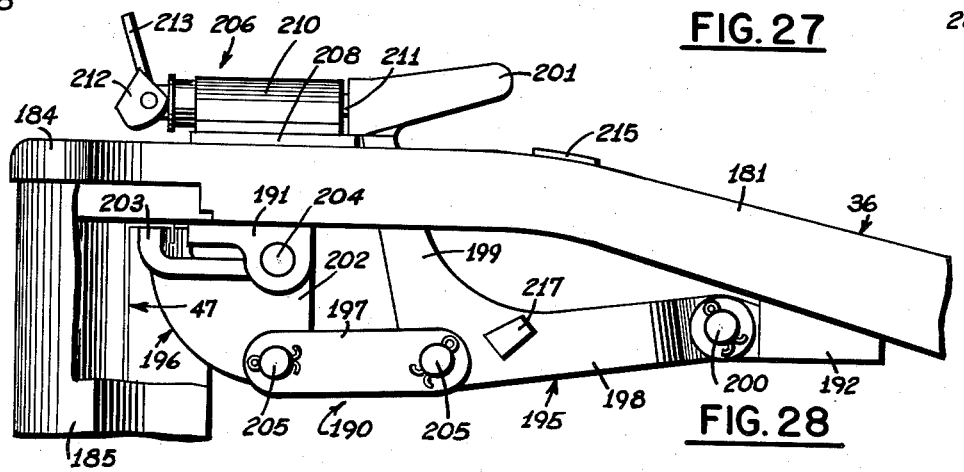
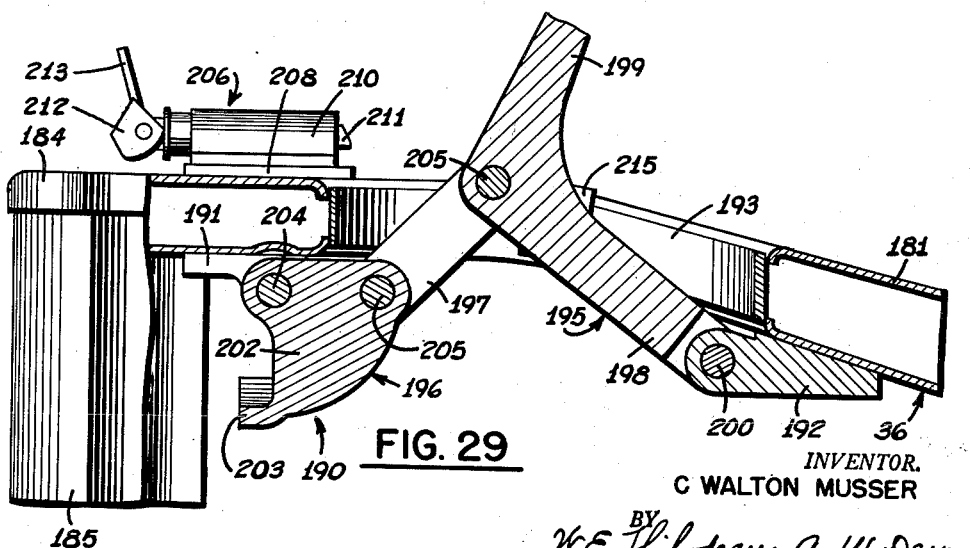

Sept. 10, 1957        C W. MUSSER        2,805,603
GUN AIMING MECHANISM WITH ASSOCIATED TRIGGER RELEASE
MECHANISM AND SUPPORTING MOUNT
Filed Feb. 24, 1953        15 Sheets-Sheet 15

INVENTOR.
C WALTON MUSSER
BY
W. E. Thibodeau, A. W. Dew
and H. J. Forman
ATTORNEYS:

United States Patent Office 2,805,603
Patented Sept. 10, 1957

2,805,603

GUN AIMING MECHANISM WITH ASSOCIATED TRIGGER RELEASE MECHANISM AND SUPPORTING MOUNT

C Walton Musser, Philadelphia, Pa., assignor to the United States of America as represented by the Secretary of the Army Application February 24, 1953, Serial No. 338,627

15 Claims. (Cl. 89—41)

(Granted under Title 35, U. S. Code (1952), sec. 266)

The invention described herein may be manufactured and used by or for the Government for governmental purposes without the payment of any royalty thereon.

My invention relates broadly to mechanisms for aiming firearms whose size and weight render them too unwieldy to be aimed by the unaided strength of man. Although not limited solely thereto, my invention relates, in particular, to aiming mechanisms for low or recoil-free firearms such as larger caliber recoilless rifles, rocket launchers, and other like weapons.

All the merits and advantages of recoilless-type firearms, especially their tremendous firepower in relation to their lightness in weight and ease of portability, compared to conventional firearms of the same caliber, are well known to those skilled in the art. However, attainment of maximum advantage and increased use of low or recoil-free firearms has been greatly curtailed by the lack of satisfactory supporting, aiming, and firing means for these weapons.

In order to gain the fullest benefit from the use of low or recoil-free firearms, the customary appurtenances for such weapons should be as small, as compact in design and construction, and as light in weight as it is possible to make them without sacrificing efficacy. This is especially true in reference to gun mounts and aiming mechanisms which, of necessity, account for the greater part of the weight of the appurtenances.

In addition to simplicity, rigidity, and lightness in weight another attribute desired in a mount for low or recoil-free firearms is that the mount be capable of being quickly and easily attached to or detached from a carrying vehicle. This permits the thus mounted weapon to be used as a highly maneuverable, highly mobile artillery piece in the first instance; or as an artillery emplacement, free of its transporting vehicle, in the second instance.

Some principal characteristics desired in an aiming mechanism for low or recoil-free firearms, in addition to the earlier mentioned smallness in size, compactness in design and construction, and lightness in weight are that the number of external elements which it is necessary for the gunner to use in actual operation of the aiming and trigger release mechanisms be kept to a minimum, and that those elements also be in such position, relative to each other, as to be within easy reach of the gunner.

Those skilled in the art know that the aiming of any type firearm involves, basically, placing the barrel of the firearm in the correct position in two imaginary mutually perpendicular reference planes, relative to the target, when visible, for direct aiming; or relative to some other reference point, when the target is hidden, for indirect aiming. For convenience, one of the reference planes is usually assumed to be horizontal and the other plane is assumed to be vertical. Positioning the barrel of the firearm in the horizontal reference plane is often synonymously referred to as "horizontal, transverse, or azimuth" adjustment, and positioning the barrel of the firearm in the vertical reference plane is often referred to as "vertical, or elevation" adjustment.

Weapons which are too large and too heavy to be supported and aimed by muscular strength alone include artillery pieces, antiaircraft guns, rocket launchers, larger caliber recoilless rifles, and the like. Weapons of this character are supported upon a mount which may rest upon the ground or which may be secured to some kind of vehicle to afford motility. They are aimed by mechanical means, and are fired by pulling on a lanyard of some kind. It is this class of weapons, especially those having little or no recoil, to which my invention pertains. My invention includes an aiming mechanism which supports one or more guns, a trigger release mechanism for firing the supported gun or guns, and a unique dual-purpose supporting mount.

Before my invention, it was customary to adapt prior art appurtenances to low or recoil-free firearms. While such adaption may have been satisfactory for some of the smaller appurtenances, it was found impractical when it came to gun mounts and aiming mechanisms.

Prior art mounts and aiming mechansims had been originally designed and constructed for use on conventional artillery pieces. Obviously, greater stresses and strains than those encountered in low or recoil-free firearms were to be encountered so that those mounts and aiming mechanisms were, of necessity, rather bulky and ponderous. When used on low or recoil-free firearms it was found that the great advantages inherent in that type of weapon could not be obtained because optimum use of those weapons was hampered by the addition of needless, excessive weight.

In addition, prior art aiming mechanisms were provided with such a multiplicity of complicatedly arranged external elements for the gunner's use in their operation that aiming a firearm was a rather time-consuming process. Too, it was found that in prior art aiming mechanisms, the direction of movement of the gun's barrel in the horizontal and vertical reference planes generally was contra to the direction of movement of the respective knob or handwheel which the gunner turned to produce that movement. This fact unnecessarily complicated the aiming process. Furthermore, once the firearm was aimed with conventional aiming mechanisms, it was then necessary for the gunner to reach for an additional operating member associated with a trigger release mechanism to discharge the firearm. If more than one firearm was supported an additional operating member was required.

All in all, prior art aiming mechanisms, trigger release mechanisms, and supporting mounts, although useful, were found to be unsuited in numerous respects for use with low or recoil-free firearms. As a result, it was not until my invention that these weapons could satisfactorily be aimed, fired and used to their maximum advantage.

I have overcome the disadvantages of prior art aiming mechanisms, and have introduced concepts new to the art by providing a small, compact, lightweight aiming mechanism having an operatively associated, yet independently functioning trigger release mechanism, and supported upon a unique, dual-purpose mount. My invention is characterized by simplicity in design and construction, strength, and ease of operation. In addition, the number of external elements required for the actual operation of my invention have been reduced to a minimum and have been located within easy reach of the gunner.

My aiming mechanism consists of two separate units: one, a horizontal adjustment unit, directly attached to the supporting mount and used for moving the firearm's barrel into proper position in the horizontal reference plane; another, a vertical adjustment unit, carried by the horizontal adjustment unit and used for moving the firearm's barrel into proper position in the vertical reference plane.

The trigger release mechanism is connected to a portion of the vertical adjustment unit and is used to discharge the firmarm which is also attached to that unit.

The dual purpose mount takes the form of a tripod which is so designed and constructed that it can be quickly and easily attached to or detached from a vehicle so that the firearm or firearms associated therewith can be used as either mobile or fixed artillery.

In essence, the horizontal adjustment unit consists of an upright, fixed, hollowed cylindrical member in which is mounted a first, fixed internal ring gear. Rotatably supported in the fixed cylindrical member, so that one end projects beyond that member, is a sleeve in which a second internal ring gear is mounted so as to be axially adjacent the first internal ring gear.

Rotatably supported between the fixed, cylindrical member and the sleeve is a gear cage which carries a first and an axially adjacent second spur gear. These spur gears are frictionally tight upon a bushing which is rotatably supported in the gear cage; and the first spur gear is in mesh with the cylindrical member's fixed internal ring gear, while the second spur gear is in mesh with the sleeve's internal ring gear.

Supported for rotation within the gear cage is a splined shaft which carries, for rotation therewith, a sun gear. This sun gear meshes with the gear cage's first spur gear, but does not mesh with the second spur gear.

By rotation of either a handwheel attached to the outer end of the gear cage, or by rotation of a knob secured to the outer end of the shaft, rotation of the sleeve with relation to the fixed, cylindrical member is accomplished.

This horizontal adjustment unit is so designed that, by virtue of existing gearing and gear relationships, the handwheel and knob always rotate in the same direction, but at different speeds; and rotation of the handwheel or the knob will result in rotation of the sleeve also in the same direction.

In the horizontal adjustment unit, the turn ratio of the sleeve to the handwheel is greater than the turn ratio between the sleeve and the knob. Therefore, the handwheel is used as the "coarse" adjustment of the horizontal adjustment unit (i. e., for moving the muzzles of the attached guns quickly through a wide range of angular adjustment in the horizontal reference plane); and the knob is used as the "fine or vernier" adjustment (i. e., for moving the muzzles of the attached guns slowly through a small range of adjustment).

Rotatably mounted upon the fixed cylindrical member is a housing from which extends a gun yoke to which the gun or guns are indirectly connected. This housing is releasably coupled, in any convenient manner, to the sleeve, and, therefore, will rotate in the same direction as that sleeve when coupled thereto; or will be freely rotatable in either direction upon the fixed cylindrical member, when not coupled to the sleeve.

The vertical adjustment unit is similar in construction and in principle of operation to the horizontal adjustment unit. Fundamentally, the vertical adjustment unit consists of a tubular member having a first internal ring gear and rotatably supported in a fixed bearing block. Attached to the bearing block, and therefore also in the fixed position, is a cover plate which has a second internal ring gear. This gear is axially adjacent the tubular member's internal ring gear.

Rotatably supported between the tubular member and the fixed cover plate is a spider which carries the axially adjacent first and second spur gears. These spur gears, like those in the horizontal adjustment unit, are frictionally tight upon a bushing which is rotatably supported in the spider; and the spider's first spur gear is in mesh with the tubular member's internal ring gear, while the spider's second spur gear is in mesh with the cover plate's internal ring gear.

Supported for rotation within the spider is a splined shaft which carries, for rotation therewith, a sun gear in relation to which the shaft is axially slidable. This sun gear meshes with the spider's first spur gear, but does not mesh with the second spur gear.

By rotation either of a handwheel attached to the outer end of the spider, or of a knob connected to the outer end of the shaft, rotation of the tubular member with relation to the fixed bearing block and the appended cover plate is accomplished.

This vertical adjustment unit, like the horizontal adjustment unit, is so designed that, by virtue of existing gearing and gear relationships, the handwheel and the knob always rotate in the same direction, but at different speeds; and rotation of the handwheel or the knob will result in rotation of the tubular member also in the same direction.

In the vertical adjustment unit, the turn ratio of the tubular member to the handwheel is greater than that between the tubular member and the knob. Therefore, the handwheel is used as the "coarse" adjustment of the vertical adjustment unit, and the knob is used as the "fine or vernier" adjustment.

Attached to the rotatable tubular member so as to rotate in unison therewith is a gun ring which carries the gun or guns attached to the aiming mechanism. In the vertical adjustment unit, the axis of the tubular member is perpendicular to that of the horizontal adjustment unit. In other words, the axis of the tubular member may be considered as being in a horizontal position. Therefore, rotation of the tubular member results in either elevation or depression of the muzzle or muzzles of supported gun or guns in a vertical reference plane, depending upon the tubular member's direction of rotation.

The trigger release mechanism briefly comprises one major active element, a "walking beam." Attached to one end of the walking beam is a flexible cable, or lanyard, which extends to the trigger mechanism of a recoilless gun; and attached to the other end of the walking beam is another flexible cable, or lanyard, which extends to the trigger mechanism of a spotting rifle. Both these trigger mechanisms contain well known means of urging the walking beam to a neutral position.

This beam is accommodated in a housing attached to the vertical adjustment unit's tubular member and is connected to that unit's shaft, so that, when the shaft is pushed in, one end of the walking beam pivots about its other end to exert a pull on the lanyard connected to the recoilless rifle's trigger mechanism. This action fires that rifle. When the vertical adjustment unit's shaft is pulled outwardly, the walking beam pivots in the opposite direction to exert a pull on the lanyard connected to the spotting rifle's trigger mechanism. This action fires that rifle.

The supporting mount to which my aiming mechanism is connected takes the form of a tripod which is fabricated from sheet metal so as to gain the advantages of lightweight, rigid construction. This mount is unique in that it can be attached to a carrier by means of a quick-action clamp, or it can easily and quickly be detached therefrom and used upon the ground.

One object of my invention is to simplify the design and construction of aiming mechanisms by minimizing the number and complexity of components contained therein, and by minimizing the number of external parts required for the actual operation of those mechanisms.

Another object is to facilitate the operation of aiming mechanisms by locating the external parts required for operation of the aiming mechanisms within easy reach of the gunner, and by having the direction of movement of those parts the same as the resultant direction of movement of the supported weapon in the horizontal and vertical reference planes, respectively.

Still another object is to provide an aiming mechanism having an operatively associated, but independently functioning, trigger release mechanism.

Yet another object is to provide a dual purpose mount for supporting the aiming mechanism and the associated trigger release mechanism.

The foregoing and other objects and advantages will become apparent from an inspection of the following description and the accompanying drawings wherein:

Fig. 1 is a side view of my gun aiming mechanism and associated trigger release mechanism with supporting mount shown in heavy solid line. For purposes of illustration the aiming and trigger release mechanisms are applied to a typical, large caliber recoilless rifle and its attached spotting rifle (both shown in light solid line), and the supporting mount is secured to a representative motor vehicle which takes the form of the jeep (also shown in light solid line). For simplicity of drawing the customary sighting system for the guns has not been shown.

The most prominent part of the aiming mechanism seen in this figure is that portion, previously referred to as the "horizontal adjustment unit," which is used for placing the rifles' barrels in proper transverse or azimuth position for firing.

Fig. 2 is a top view, taken along line 2—2 of Fig. 1, of my aiming mechanism and supporting mount shown in heavy line, and of a portion of the recoilless rifle, spotting rifle, and jeep shown in light line. This figure gives prominence to that portion of the aiming mechanism, previously referred to as the "vertical adjustment unit," which is used for placing the rifles' barrels at proper elevation or depression for firing.

Fig. 5 is partly an outside view and partly a vertical cross-section of the lower portion of the horizontal adjustment unit taken along line 5—5 of Fig. 4 to show interior structural details of that unit, but drawn to a larger scale than Fig. 4.

Figure 4:
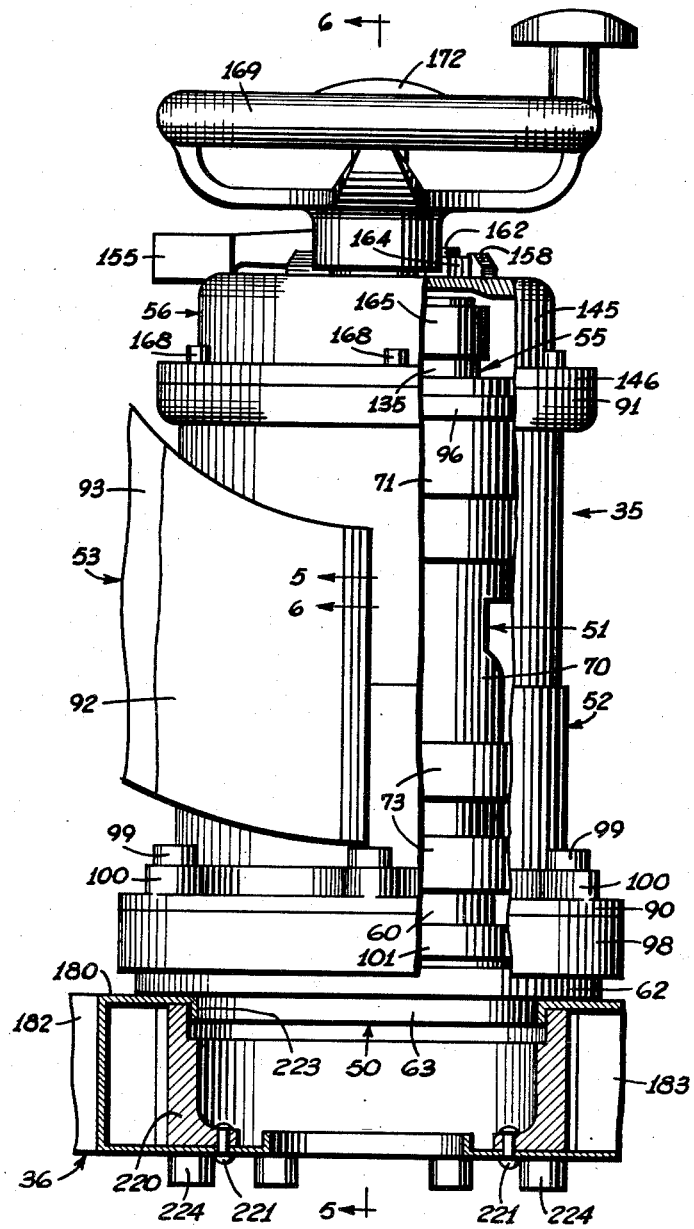
Fig. 4 is an enlarged view, partly in section and partly broken away, of a corresponding portion of Fig. 1 showing, primarily, some of the basic components of the horizontal adjustment unit. To supply additional information, that portion of the supporting mount upon which the horizontal adjustment unit rests is shown in section.

Fig. 6 is a vertical cross-section of the upper portion of the horizontal adjustment unit taken along line 6—6 of Fig. 4 to show more interior details of that unit, but also drawn to a larger scale. This figure is complementary to Fig. 5 so that, if the latter drawing sheet is placed in alignment below Fig. 6, a clear impression of a complete vertical cross-section through the horizontal adjustment unit can be obtained. For ease of association between Figs. 5 and 6, some of the elements shown at the top of Fig. 5 are repeated at the bottom of Fig. 6.

Fig. 7 is a horizontal cross-section, partly broken away, taken along line 7—7 of Fig. 6 but completed to show more fully interior details of the horizontal adjustment unit.

Fig. 8 is a horizontal cross-section taken along line 8—8 of Fig. 6 showing, primarily, a first gear relationship existing in the horizontal adjustment unit. For convenience, this figure has been extended somewhat to include more than would actually be shown by a true cross-section.

Figure 9:
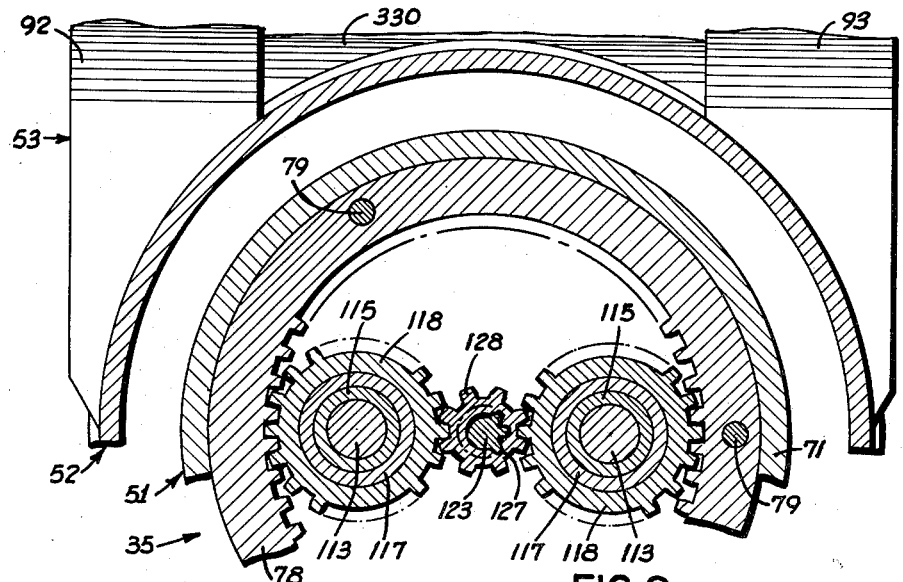

Fig. 9 is a horizontal cross-section taken along line 9—9 of Fig. 6, but also extended somewhat, to show, especially, a second gear relationship existing in the horizontal adjustment unit.

Figure 10:
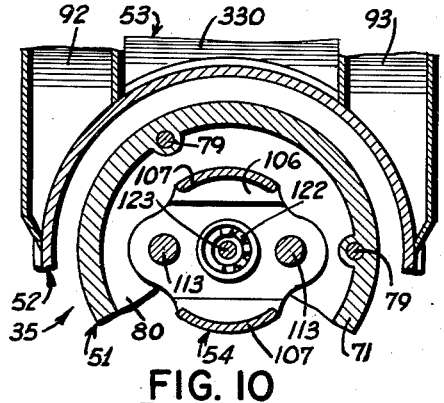

Fig. 10 is a horizontal cross-section taken along line 10—10 of Fig. 6 and showing some details of the components there involved. For convenience, this figure, too, has been extended somewhat to include more than would actually be shown by a true cross-section.

Figure 11:
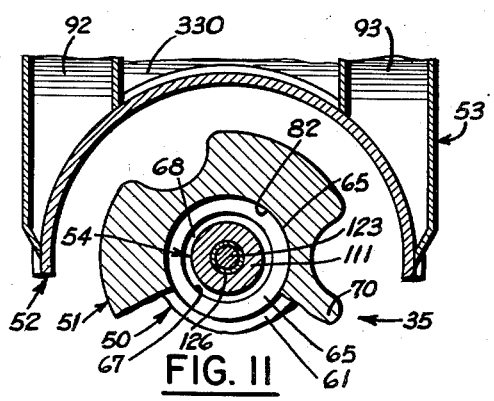

Fig. 11 is a horizontal cross-section taken along line 11—11 of Fig. 5 and showing some detail of the components there involved. Like the preceding Figs. 8 to 10, Fig. 11 has been extended somewhat for convenience.

Figure 12:
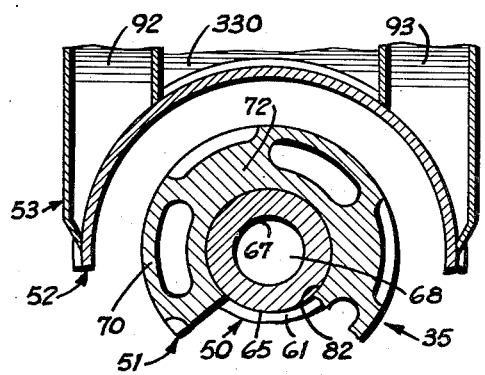

Fig. 12 is a horizontal cross-section taken along line 12—12 of Fig. 5, but also extended to show further details of some components.

Figure 13:
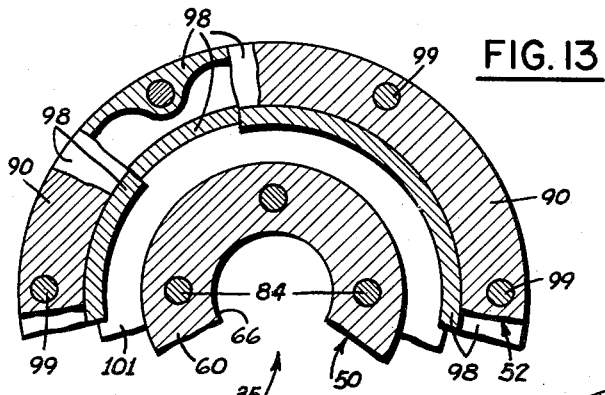

Fig. 13 is a horizontal cross-section, partly broken away, taken along line 13—13 of Fig. 5, and also extended, to show more details of certain components.

Figure 14:
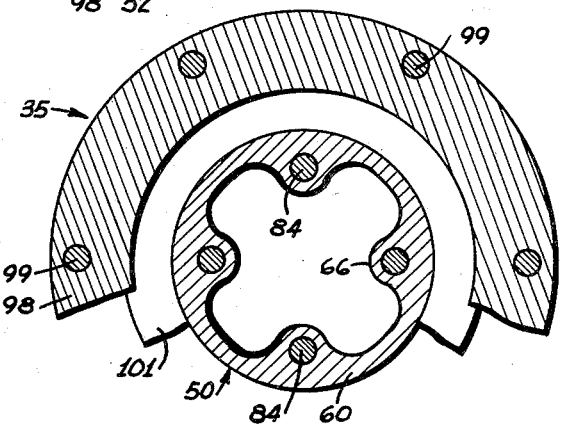

Fig. 14 is a horizontal cross-section taken along line 14—14 of Fig. 5, but also extended as in preceding figures, to show structural details at that plane across the horizontal adjustment unit.

Figure 15:
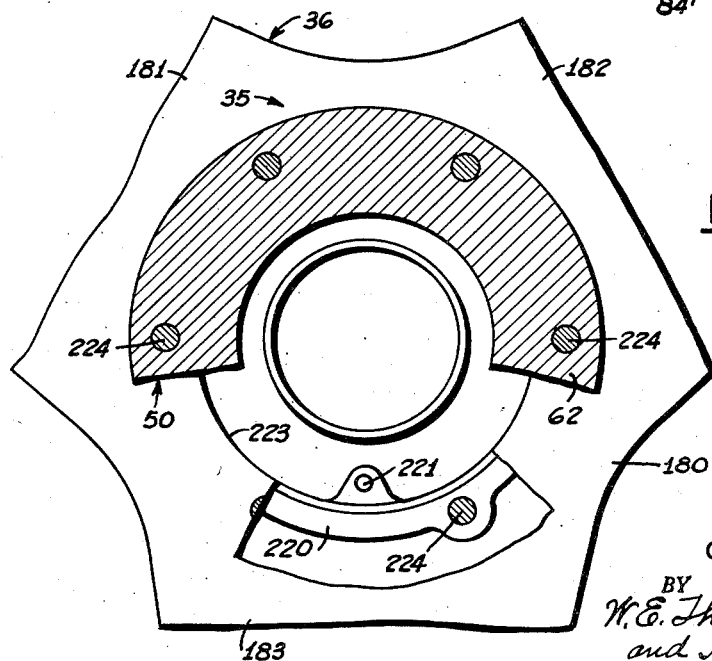

Fig. 15 is a horizontal cross-section taken along line 15—15 of Fig. 5 to show details of the attachment of the horizontal adjustment unit to the supporting mount. For added information, that portion of the supporting mount to which the horizontal adjustment unit is attached is partly broken away to expose a fitting included in the mount.

Figure 2:
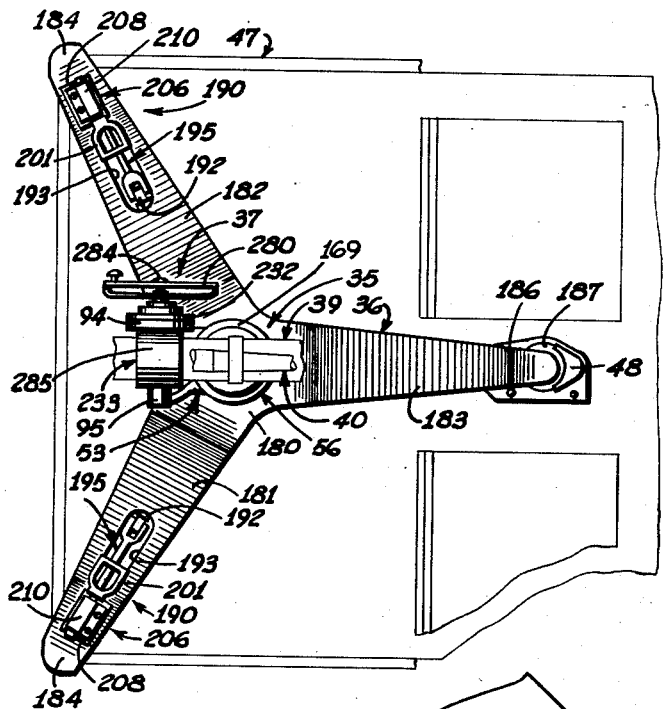
Figure 16:
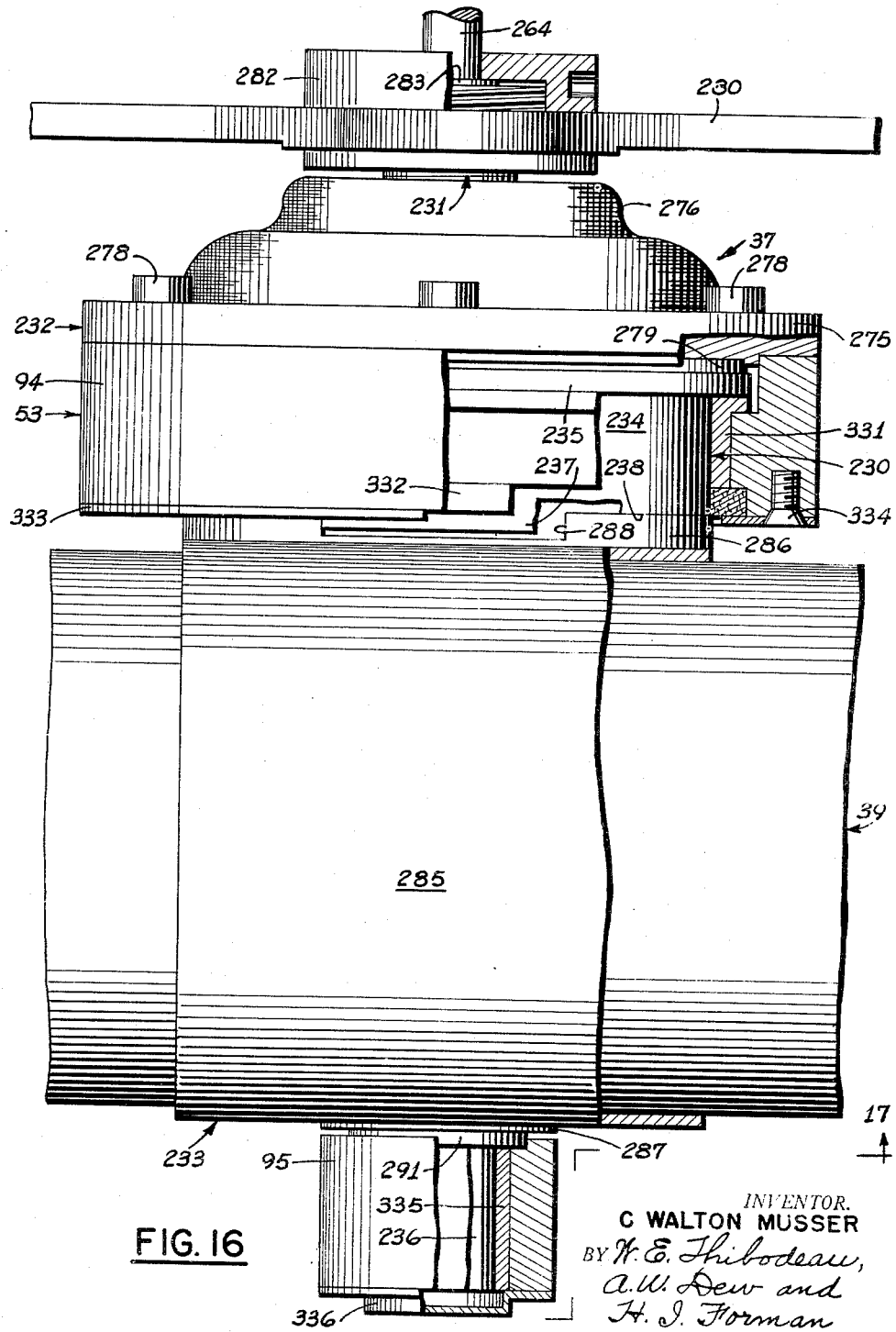

Fig. 16 is an enlargement, partly broken away and partly in section, of the portion of Fig. 2 corresponding therewith showing the vertical adjustment unit and some of the basic components thereof.

Figure 17:
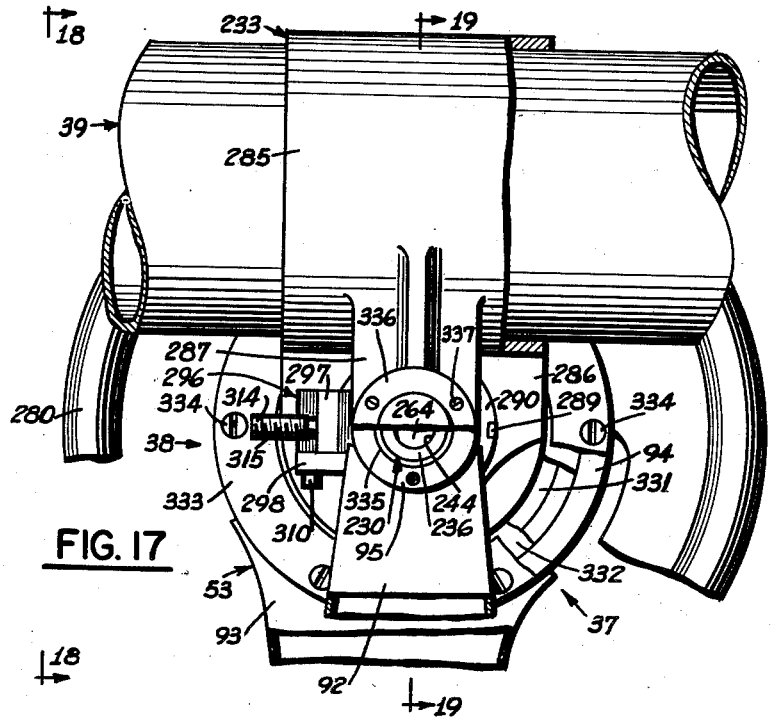

Fig. 17 is a side view, partly in section and partly broken away, of the vertical adjustment unit and a portion of the trigger release mechanism taken along line 17—17 of Fig. 16. Actually, Fig. 17 is an enlargement of the corresponding portion of Fig. 1.

Figure 18:
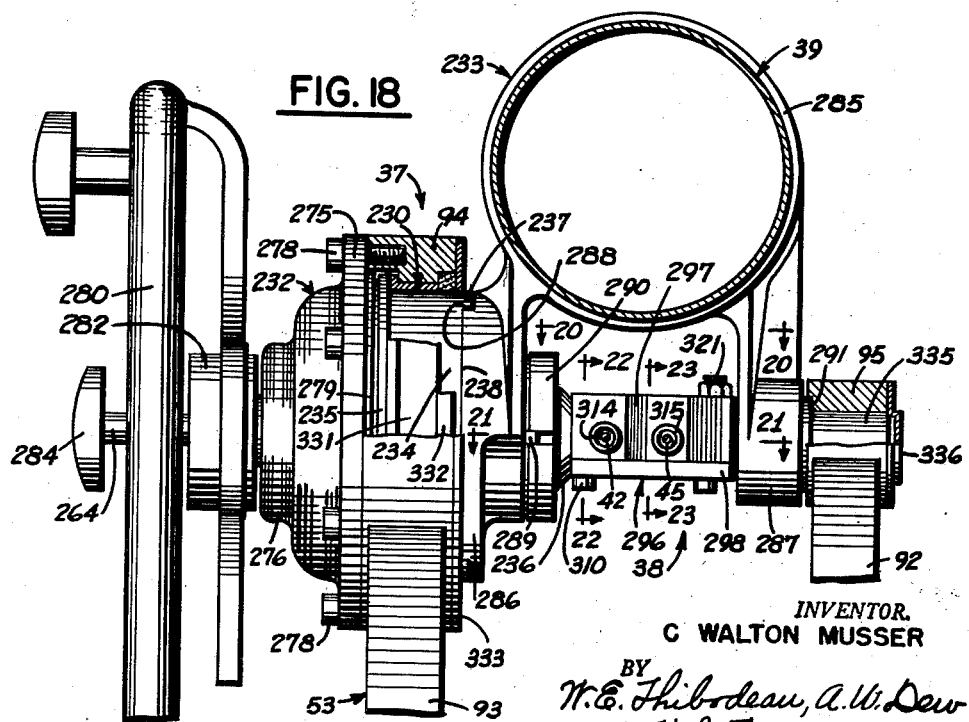

Fig. 18 is an end view, partly broken away and partly in section, taken along line 18—18 of Fig. 17 and showing other basic components of the vertical adjustment unit and the trigger release mechanism.

Figure 19:
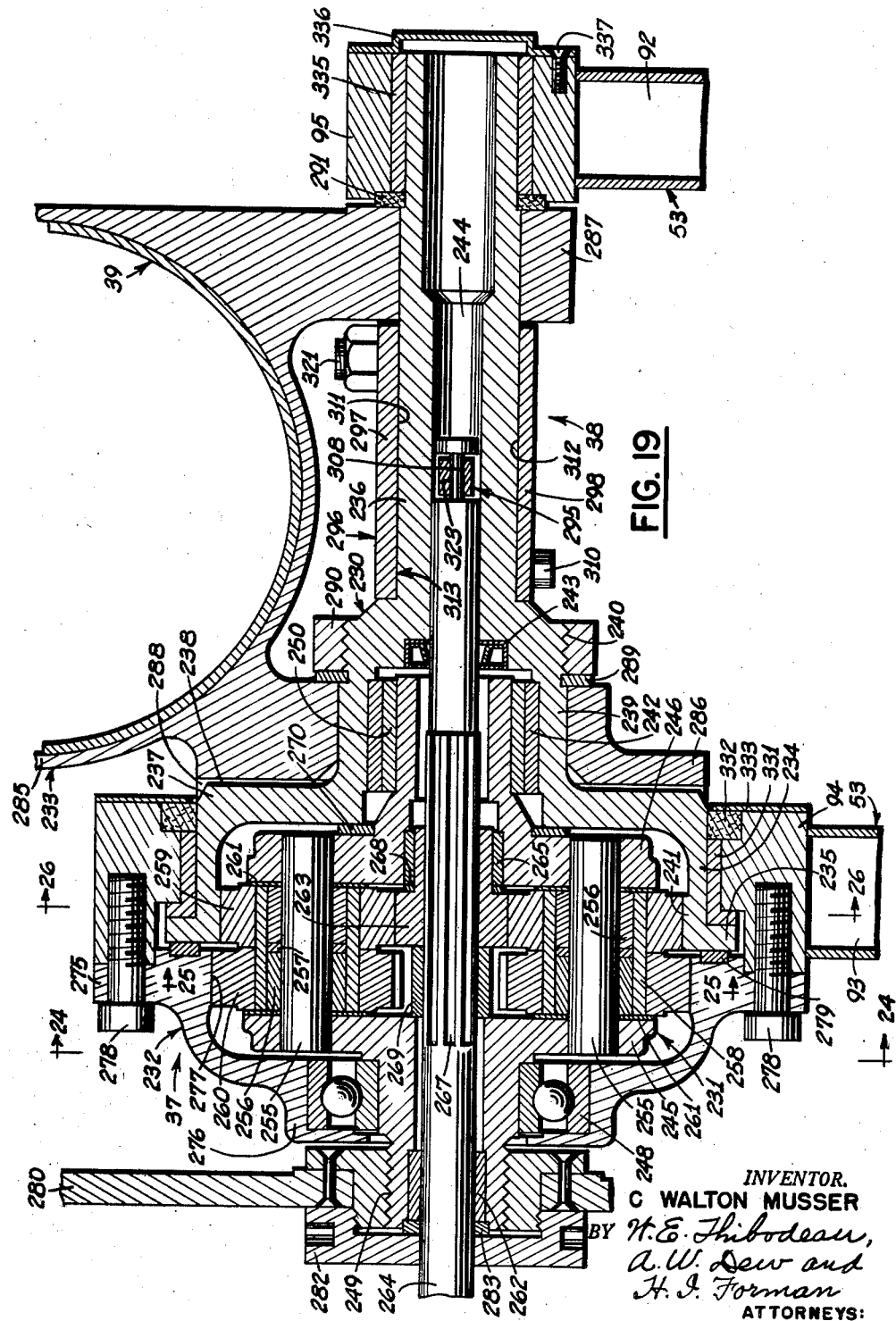

Fig. 19 is an enlarged vertical cross-section taken along line 19—19 of Fig. 17 to show interior details of the vertical adjustment unit and of the trigger release mechanism associated therewith.

Fig. 20 is an enlarged horizontal cross-section taken along line 20—20 of Fig. 18 to show a top view of the trigger release mechanism which has been partly broken away and partly sectioned to expose interior details, and to show the working element of that mechanism in one position.

Fig. 21 is also an enlarged horizontal cross-section taken along line 21—21 of Fig. 18 to show details of the trigger release mechanism and the action which takes place within that mechanism when its working element is moved toward a second position.

Fig. 21A is a similarly enlarged horizontal cross-section, like that of Fig. 21, but showing the action which takes place within the trigger release mechanism when its working element is moved toward a third position.

Fig. 22 is an enlarged vertical cross-section taken along line 22—22 of Fig. 18 to show further details of the trigger release mechanism.

Figure 23:
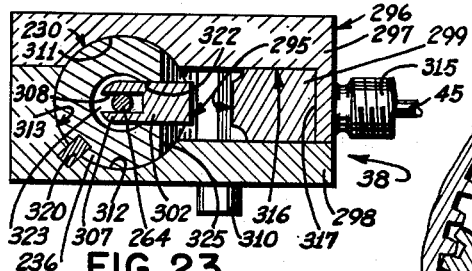

Fig. 23 is also an enlarged vertical cross-section taken along line 23—23 of Fig. 18 and showing additional details of the trigger release mechanism.

Fig. 24 is a vertical cross-section taken along line 24—24 of Fig. 19, but drawn to a slightly smaller scale, to expose the elevation adjustment unit's gear cage.

Figure 25:
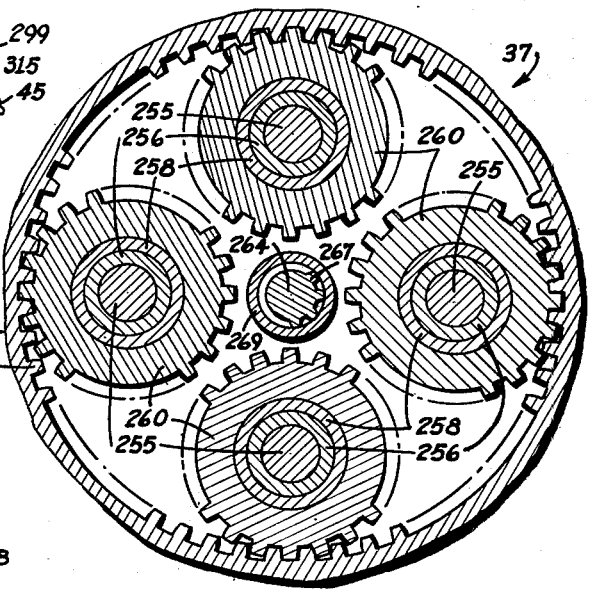

Fig. 25 is a vertical cross-section taken along line

25—25 of Fig. 19 to show a first gear relationship existing in the vertical adjustment unit.

Figure 26:
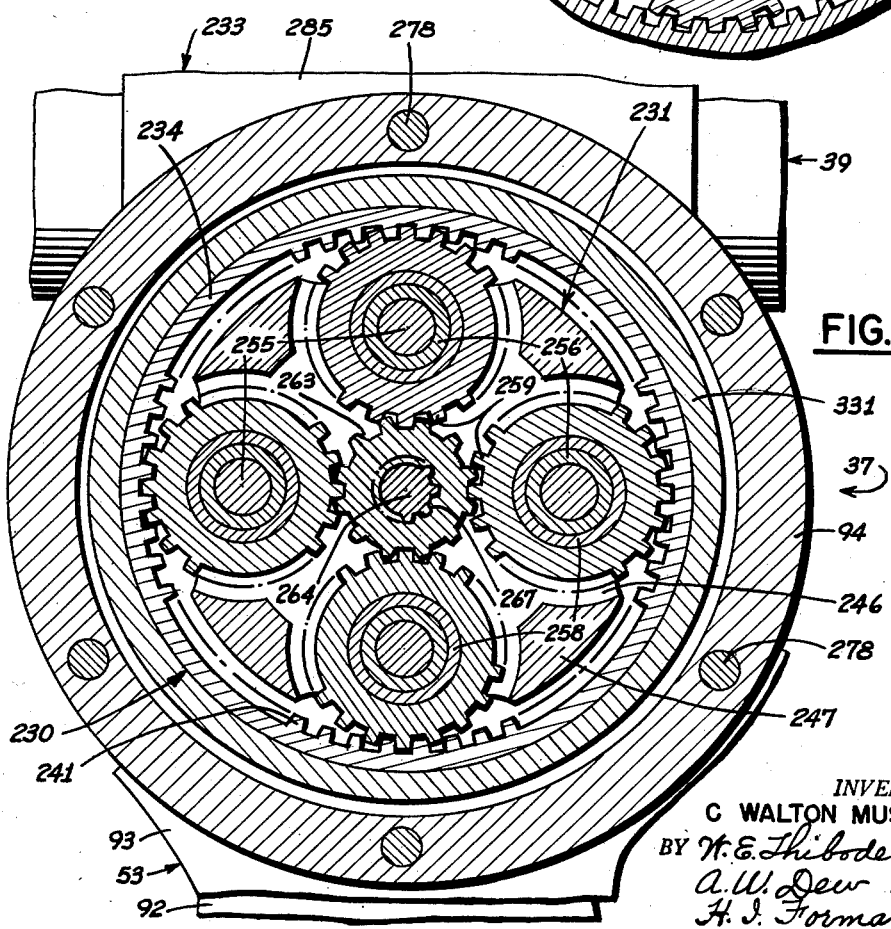

Fig. 26 is a vertical cross-section taken along line 26—26 of Fig. 19 to show a second gear relationship existing in the vertical adjustment unit.

Fig. 27 is a top view of a clamping means by which the supporting mount is secured into the jeep or other carrier. This figure is actually an enlargement of the two corresponding portions of Fig. 2.

Fig. 28 is a side view, partly broken away, of the clamping means taken along line 28—28 of Fig. 27 and showing the clamp in the "closed and locked" position.

Fig. 29 is a vertical cross-section taken along line 29—29 of Fig. 27 and showing the clamp in the "unlocked and open" position.

Figure 30:
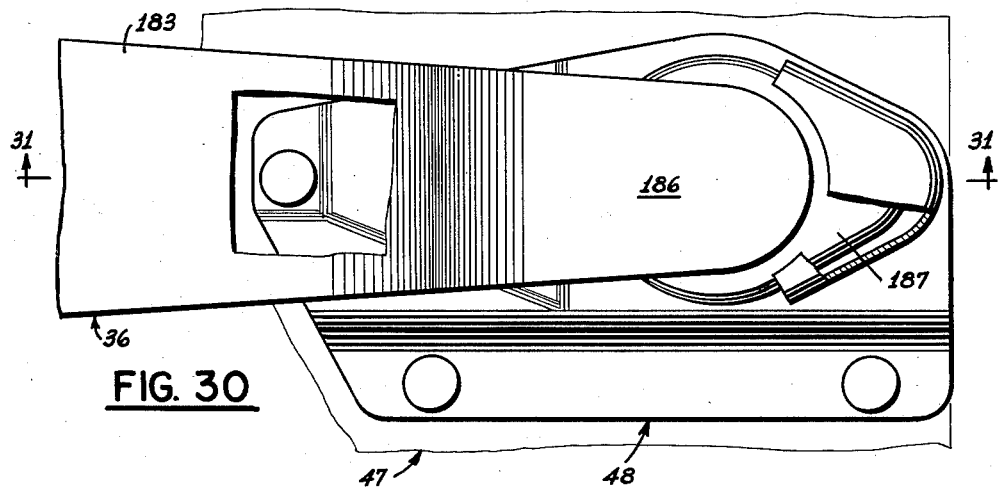

Fig. 30 is a plan view, partly in section and partly broken away, showing details of a stirrup used for positioning one leg of the supporting mount in the jeep. This figure is actually an enlargement of the corresponding portion of Fig. 2.

Figure 31:
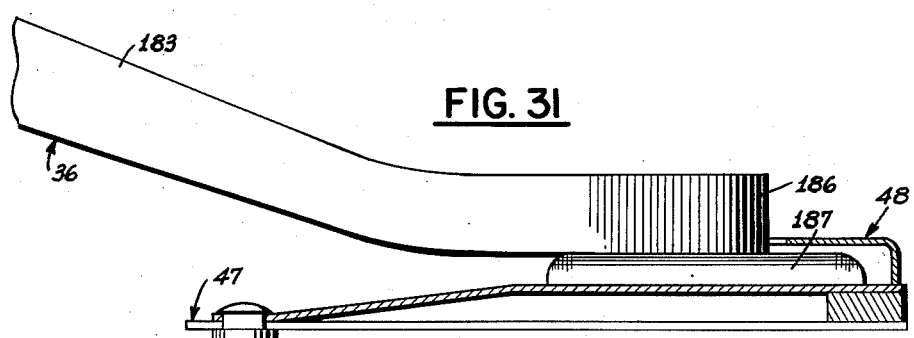

Fig. 31 is a vertical cross-section taken along line 31—31 of Fig. 30 to show more details of the stirrup.

Figure 1:
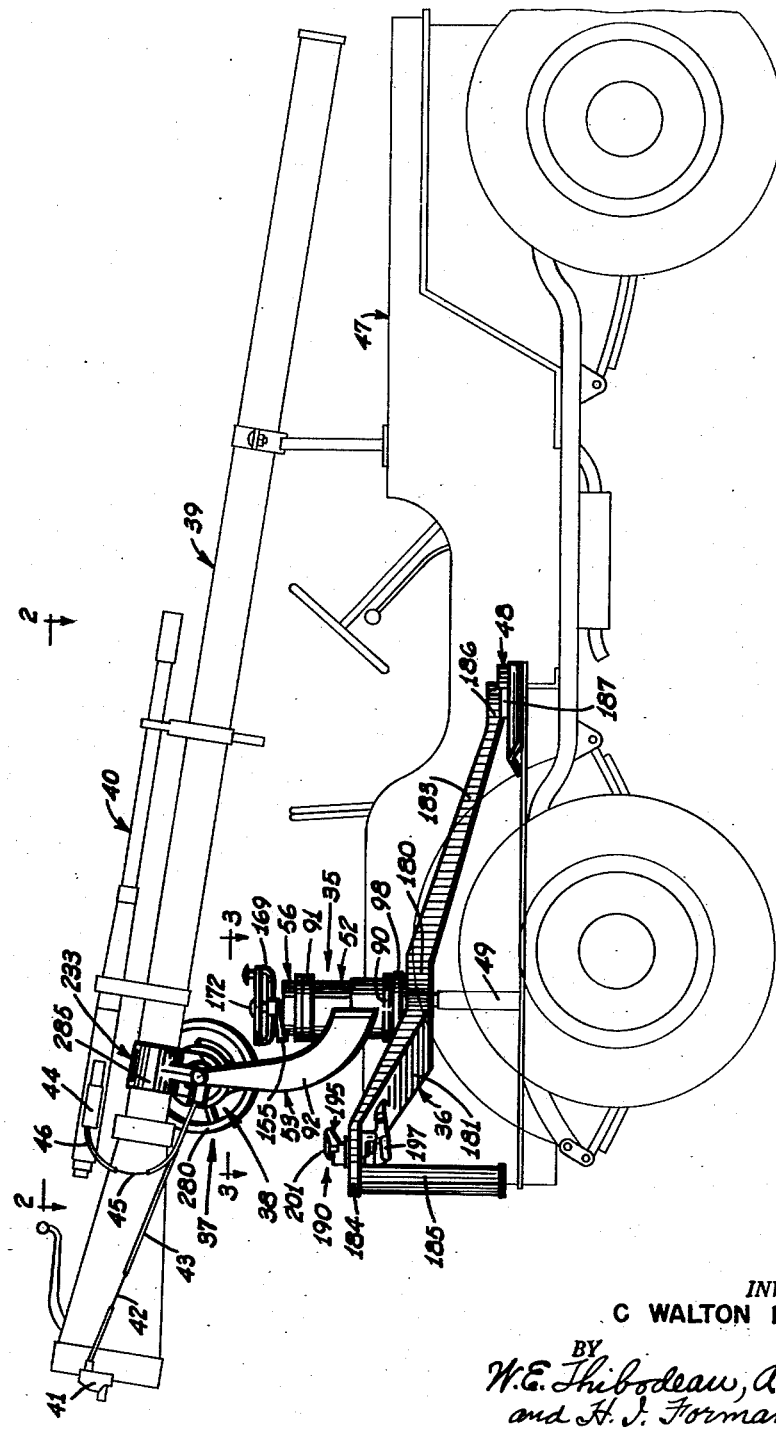
Figure 32:
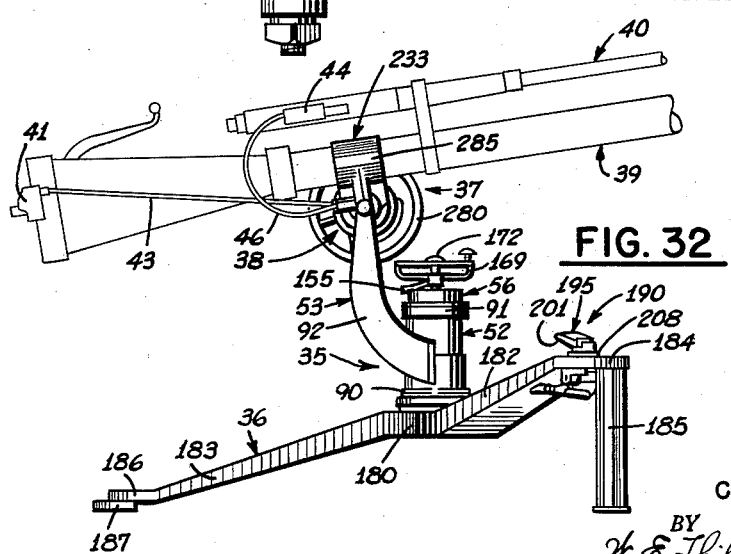

Fig. 32 is a side view, similar to Fig. 1, showing my aiming mechanism and associated trigger release mechanism with supporting mount detached from the jeep and placed upon the ground or other fixed surface.

For illustrative purposes (see Fig. 1) I have represented my aiming mechanism and associated trigger release mechanism with supporting mount as being adapted to the large caliber recoilless rifle 39 upon which the spotting rifle 40 is mounted. Forming part of the recoilless rifle is the trigger mechanism 41 which is operated to fire that rifle by exerting a pull on the flexible cable 42 slidably contained in the housing 43; and forming a part of the spotting rifle is the trigger mechanism 44 which is operated to fire that rifle by exerting a pull on the flexible cable 45 slidably contained in the housing 46.

The rifles, aiming mechanism and associated trigger release mechanism are shown mounted in the motor vehicle 47 which contains the stirrup 48 in which one leg of the supporting mount is accommodated, and the auxiliary brace 49 which affords additional support to the mount and its appended parts when the jeep travels on rough terrain.

In order to facilitate the clear understanding of my invention and the full appreciation of the novel features thereof, it may be advantageous to consider my invention as comprising the combination of the horizontal adjustment unit 35, the supporting mount 36, the vertical adjustment unit 37, and the trigger release mechanism 38.

One by one the components of these basic entities will be presented and described in essential detail, then their collective functioning will be explained.

HORIZONTAL ADJUSTMENT UNIT

Horizontal adjustment unit 35, as earlier mentioned, is a mechanism for placing the rifles in proper angular adjustment in an imaginary horizontal reference plane. This unit is shown in side view in Figs. 1, 4, and 32, in top view in Figs. 2 and 3, in vertical cross-section in Figs. 5 and 6, and in horizontal cross-section in Figs. 7 to 15.

The principal components of the horizontal adjustment unit, from the standpoint of basic structure, are: the post 50, the post adjunct 51, the housing 52, the gun yoke 53, the gear cage 54, the sleeve 55, and the housing cap 56. The essential details of those components will now be described.

Post

Post 50 is substantially a hollow, cylindrical member which serves as the foundation upon which the horizontal adjustment unit is constructed. The post is shown partly in side view in Fig. 4, in vertical cross-section in Figs. 5 and 6, in plan view in Fig. 11, and in horizontal cross-section in Figs. 12 to 15. This post comprises the base portion 60 (see Figs. 4, 5, 13 and 14) and the shank 61 (see Figs. 5, 6 and 11).

Base portion 60 is provided with the flange 62 (see Figs. 4, 5, and 15) from whose lower surface the locating lug 63 projects downward as shown in Figs. 4 and 5.

Shank portion 61 projects upward from the center of the base portion's upper surface and has the circumferential band 64 at its lower end (see Fig. 5) and the smaller diametered circumferential band 65 at its upper end (see Figs. 5, 6, 11, and 12).

As shown in Fig. 5, the hollow interior of post 50 is separated into the lower cavity 66 and the upper cavity 67 by means of the transverse web 68 (also see Figs. 6, 11 and 12) which acts as a barrier against intrusion of dirt and other foreign matter into the unit.

Post adjunct

Post adjunct 51 is essentially a hollow, cylindrical member and is shown in vertical elevation in Figs. 4 to 6 and in horizontal cross-section in Figs. 8 to 12. This post adjunct, in vertical elevation (see Figs. 4 to 6), consists of a skirt portion 70 at its lower end (see Figs. 4 to 6, 11 and 12) and a somewhat enlarged diametered bowl portion 71 at its upper end (see Figs. 4 to 10). It can also be seen, in Figs. 5 and 6, that the interior of the adjunct is provided with a transverse web 72 which separates the interior of the post adjunct so that a vertical cross-section through the adjunct (see Fig. 5) somewhat resembles the letter H.

Skirt portion 70, at its lower end, is provided with a circumferential, shouldered bearing seat upon which the bearing 73 is fitted in usual manner (see Figs. 4 and 5). Inside the skirt portion, at its lower end, is the opening 74 (see Fig. 5) which serves, later, to locate the adjunct's lower end upon post 50.

Bowl portion 71 of the post adjunct is provided, near its top, with the raised, circumferential bearing band 75 (see Figs. 6 to 8) which fits inside the bearing 96 (see Figs. 4, 6, and 7) in usual manner during subsequent assembly of housing 52 to the post and the post adjunct.

Internally, bowl portion 71 is provided with a number of concentric, axially aligned recesses. Each recess is the same size throughout its vertical extent, but is slightly greater in diameter than the one below it. These recesses are the threaded recess 76 (see Figs. 6 and 7) which is outermost, a recess in which the bushing 77 (see Figs. 6 and 8) is secured in any convenient manner, as by rivets (not shown), a recess in which the internal ring gear 78 is secured as by a plurality of rivets 79 (see Figs. 6 and 9), and the clearance recess 80 (see Figs. 5, 6, and 10).

Transverse web 72, as shown in Figs. 5 and 6, is provided with upper and lower axially aligned recesses 81 and 82 respectively. Upper recess 81 is somewhat larger in diameter than lower recess 82 and accommodates the bearing 83 later to be described in connection with gear cage 54. Lower recess 82 as shown in Figs. 5, 6, 11 and 12, matingly accommodates the post's upper circumferential band 65 upon subsequent assembly to the post.

Also, in assembly with post 50 (see Fig. 5) the post adjunct rests atop the post's base portion 60 with the post's lower circumferential band 64 accommodated in the adjunct's opening 74 and with the post's upper circumferential band 65 accommodated, as earlier mentioned, in the adjunct's lower recess 82 (also see Figs. 11 and 12). Note also, in Fig. 5, that the post adjunct's bearing 73 is secured against axial displacement between the adjunct and the upper surface of the post's base portion 60. This assembly is firmly secured by means of the screws 84 (see Figs. 5, 13, and 14) which pass through conveniently spaced accommodating openings in the post's base portion and thread into the lower end of the post adjunct.

It should be noted that the post adjunct 51 is non-rotatably secured to the stationary post. Because the post adjunct thus is fixed, internal ring gear 78 fastened thereto is also in a fixed position.

Housing

Housing 52 is a tubular member which, as will be shown later, is caused to rotate relative to fixed post 50 and its attached post adjunct 51. This housing is shown in side elevation in Figs. 1 and 4 to 6, and in horizontal cross-section in Figs. 8 to 13.

Externally, housing 52 is provided with the base flange 90 (see Figs. 4, 5, and 13), with the top flange 91 (see Figs. 4, 6, 7, and 8), and with earlier mentioned gun yoke 53 (see Figs. 1 to 12).

Internally the tubular housing is provided at its upper end, with a shouldered recess which accommodates earlier mentioned bearing 96 (see Figs. 6 to 8) and, at its lower end, with the shouldered recess 97 (see Fig. 5) which, during later assembly, accommodates the outer race of the post adjunct's bearing 73.

In assembling housing 52 to the already assembled post 50 and post adjunct 51, the housing's shouldered recess 97 accommodates the post adjunct's bearing 73 in usual manner (see Fig. 5) and the housing's bearing 96 fits around the adjunct's circumferential bearing band 75 (see Figs. 6 and 7). Housing 52 is thus supported relative to co-joined post and post adjunct and, at this point, is freely rotatable in either clockwise or counterclockwise direction (as viewed in Figs. 2 and 7 to 13) relative to those parts.

Housing 52 is secured against axial displacement relative to the post and the post adjunct by means of the clamp ring 98 (see Figs. 4, 5, 13 and 14) which is fastened to the bottom of the housing's base flange 90 by means of the screws 99 (see Figs. 3 to 5, 13 and 14) which pass through accommodating openings in lugs 100 (see Figs. 3 to 5) conveniently formed in the flange and thread into the clamp ring. Within the opening of this ring is the sealing member 101 (see Figs. 4, 5, 13 and 14) which excludes dirt and other foreign matter from inside the horizontal adjustment unit at its lower end.

Gun yoke

Gun yoke 53 is interposed between the housing's top and bottom flanges 91 and 90 respectively (see Figs. 1, 4 and 32) and forms an integral part of that housing.

In order to obtain the advantages of lightweight, rigid construction, this gun yoke may conveniently be fabricated from sheet metal which is formed into members having boxlike cross-section, reinforced at desirable places, and welded into a sturdy yoke for supporting vertical adjustment unit 37 and the parts attached thereto.

Gun yoke 53 is shown in side elevation in Figs. 1 and 32, in top plan view in Fig. 2, in partial end view in Fig. 6 and in horizontal cross-section in Figs. 8 to 11 inclusive.

Essentially this gun yoke consists of the laterally spaced arms 92 and 93 (see Figs. 6 to 12). At their lower ends these arms are integrally connected, as by welding, to opposite sides of housing 52 between its base and top flanges. From there they project outwardly and upwardly (see Figs. 1 and 32) from the housing so that the arms' upper, free ends terminate somewhat above the housing. These arms are strengthened for a convenient distance from the housing by the web 330 (see Figs. 3 and 7 to 12) which is welded to the inner surfaces of the arms and the housing.

These arms are substantially the same shape (see Figs. 1 and 32) except that arm 92 is provided at its upper, free end with the large pillow block 94 (see Figs. 2, 16 to 19, 24 and 26), while arm 93 is provided at its upper, free end with the small pillow block 95 (see Figs. 2 and 16 to 19).

Large pillow block 94 secured to the yoke's arm 92 is provided, from its outer face, with a shouldered recess which accommodates the flanged bushing 331 (see Figs. 16 to 19 and 26) whose inner end (i. e., toward small pillow block 95) stops somewhat short of the large pillow block's inner face. Accommodated in the large pillow block, in a recess concentric to and adjacent the bushing's inner end, is the packing ring 332 (see Figs. 16 to 19). This ring is held in place by the retaining ring 333 (also see Figs. 16 to 19) which is secured to the pillow block's inner face by means of the screws 334 (see Figs. 16 and 17).

Small pillow block 95 secured to the yoke's arms 93 is provided with an axial opening which accommodates the bushing 335 (see Figs. 16 to 19). This bushing is axially aligned with the large pillow block's bushing 331 and is held in place, from the outside, by the cover plate 336 (see Figs. 16 to 19) which is secured to the small pillow block's outer face by the screws 337 (see Figs. 17 and 19).

Gear cage

Gear cage 54 is shown in full length in Fig. 6, in partial length in Fig. 5, and in horizontal cross-section in Figs. 7, 8, 10 and 11. This gear cage consists of an upper plate 105 (see Figs. 6 and 8) and a similarly shaped lower plate 106 (see Figs. 6, 8, and 10). These plates are held in vertically spaced, aligned, parallel relationship by means of the diametrically opposed webs 107 (see Figs. 8 and 10) which extend therebetween and which are an integral part of the gear cage.

Projecting upward from the central portion of upper plate 105 is the shank 108 (see Figs. 6, 7, and 8) having the screw threads 109 at its upper end (see Fig. 6) and the bearing 110, positioned in the usual manner, at its lower end (see Figs. 6 and 7).

Projecting downward from the central portion of lower plate 106, in axial alignment with shank 108, is the boss 111 (see Figs. 5, 6, and 11) which, in a manner similar to shank 108, is provided with bearing 83, earlier mentioned (see Figs. 5 and 6).

Extending between the gear cage's spaced upper and lower plates, parallel to shank 108 and the aligned boss 111, and substantially diametrically opposed to each other, are the pins 113 (see Figs. 6, 8, 9, and 10) which are secured in place in any convenient manner as by means of set screws 114 (see Fig. 6).

Rotatably mounted upon each pin through the intermediary bushings 115 (see Figs. 6, 8, and 9) which are separated by the spacer 116 (see Fig. 6) is the sleeve 117 (see Figs. 6, 8, and 9).

Frictionally tight upon the lower portion of each sleeve is the planet gear 118 (see Figs. 6 and 9), and frictionally tight upon the upper portion of each sleeve is the sleeve drive gear 119 (see Figs. 6 and 8). Gears 118 and 119 are conveniently spaced from the gear cage's upper and lower plates, respectively, by means of washers 120 (see Fig. 6).

A very important relationship existing between each planet gear and each spindle drive gear is that the pitch diameter of the planet gear is slightly greater (approximately 0.013 of an inch in the present instance) than the pitch diameter of the sleeve drive gear. Another feature to be pointed out, by restatement, is that the planet gears and the spindle drive gears are only frictionally tight upon their respective sleeves. Later it will be apparent that this fact provides an overload feature to the horizontal adjustment unit, and eliminates the possibility of damage to that adjustment unit's components.

Extending axially through gear cage 54 in which it is rotatably supported in convenient manner by the bushing 121, at its upper end (see Fig. 6), and the bearing 122 near its lower end (see Figs. 6, 8, and 10), is the shaft 123 (also see Figs. 5 to 11). This shaft, as shown in Fig. 6, is rotatably retained in gear cage 54 by means of the lock washer 124 and the nut 125 which fit upon the shaft's lower end where they are spaced the desired distance from bearing 122 by means of the spacer 126 (also see Fig. 5). Near its lower end, shaft 123 is provided with the splined portion 127 upon which the sun gear 128 is mounted (see Figs. 6 and 9). Notice in the last-named figures that sun gear 128 meshes only with planet gears 118, and, in Fig. 6, that there is no engagement between shaft 123 and spindle drive gears 119.

In assembling gear cage 54 into post adjunct 51, the gear cage's bearing 83 rests in the adjunct's shouldered recess 81, thus rotatably supporting the cage's lower end (see Figs. 5 and 6). The shaft's lower end, lock washer 124 and nut 125 project part way into the post's upper cavity 67 (also see Figs. 5 and 6) and planet gears 118 mesh with the adjunct's fixed internal ring gear 78 (see Figs. 6 and 9).

Sleeve

Support for the cage's upper end is provided by sleeve 55. This sleeve is shown in full length in Fig. 6, and in horizontal cross-section in Figs. 7 and 8. It is a cylindrical member comprising a drum portion 135 at its upper end (see Figs. 6 and 7) and a larger diametered skirt portion 136 at its lower end (see Figs. 6 and 8).

Internally the sleeve is provided with a transverse web 137 (see Figs. 6 and 7) which contains the shouldered recess 138 for later accommodation in convenient manner of the gear cage shank's bearing 110 (see Fig. 6). Also internally, the lower end of the spindle's skirt portion 136 is provided with gear teeth 139 (see Figs. 6 and 8). The pitch diameter of these teeth is smaller than the pitch diameter of internal ring gear 78 by the same amount (approximately 0.013 of an inch in the present instance) that the pitch diameter of spindle drive gears 119 is smaller than that of planet gears 118.

In assembly, sleeve 55 fits into the already assembled post adjunct and gear cage in the following manner. The sleeve's skirt portion 136 rotatably fits inside the post adjunct's bushing 77 (see Figs. 6 and 8) with recess 138 fitting over the outer race of the gear cage shank's bearing 110 (see Fig. 6) so that the skirt portion's internal gear teeth 139 mesh with the gear cage's spindle drive gears 119 (also see Fig. 8). The assembly of the sleeve with post adjunct 51 and gear cage 54 is secured by means of the retaining ring 140 (see Figs. 6 and 7) which threads into the post adjunct's recess 76 where it is secured in any convenient manner (not shown) to rest lightly upon the top surface of the sleeve's skirt portion (see Fig. 6). When so assembled, the spindle's drum portion 135 extends somewhat above the top of housing 52 as shown in Fig. 6.

Housing cap

Housing cap 56 is the last large member of horizontal adjustment unit 35. This cap is shown in side elevation in Figs. 1 and 4, in top plan view in Figs. 2 and 3, in vertical cross-section in Fig. 6, and in horizontal cross-section in Fig. 7.

Essentially, the housing cap consists of the dome portion 145 which is provided at its lower end with the flange 146 (see Figs. 3, 4, 6 and 7). Axially located in the dome portion is the opening 147 (see Fig. 6) through which the gear cage's shank 108 projects at later assembly.

Positioned in the housing cap near its side wall, parallel to the cap's axis, are the clutch operating pin 148 (see Figs. 6 and 7) and the clutch adjusting pin 149 (see Fig. 7).

Clutch operating pin 148 consists of the head portion 150 (see Figs. 6 and 7) which is rotatably accommodated in the tab 151 formed inside the housing cap at its lower end (also see Figs. 6 and 7), the eccentrically offset intermediate portion 152 provided with the bushing 153 (see Figs. 6 and 7), and the outer portion 154 (see Figs. 2 and 6) whose axis is concentric with that of head portion 150.

As shown in Fig. 6, outer portion 154 of the clutch operating pin extends through a convenient opening in the top of housing cap 56 and is provided with the clutch lever 155 (also see Figs. 1, 3 and 4) which is secured thereon by means of the pin 156 and which retains the clutch operating pin in the housing cap.

Figure 3:
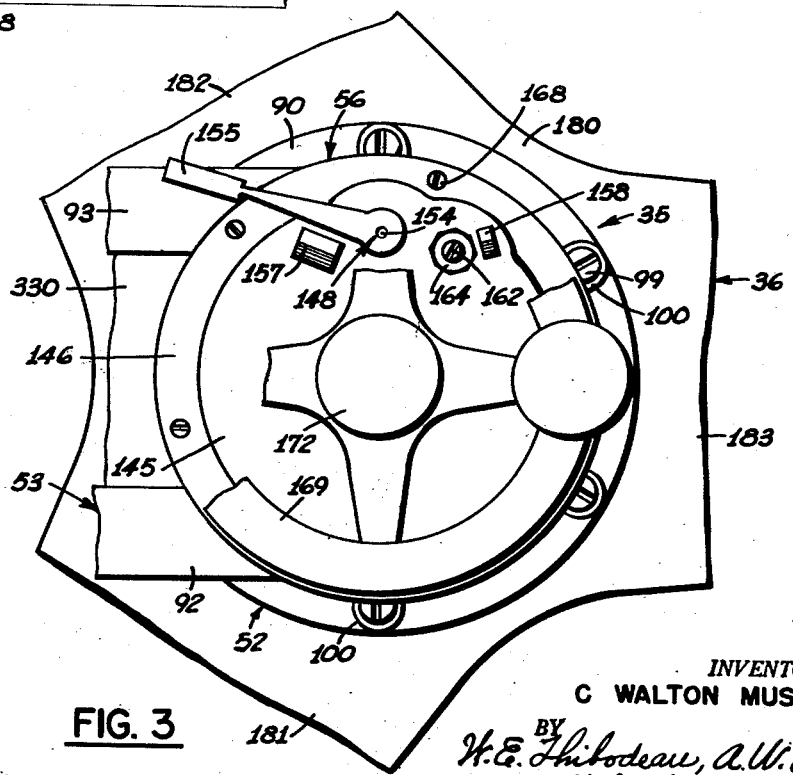
Fig. 3 is a top view of the horizontal adjustment unit and a portion of the supporting mount taken along line 3—3 of Fig. 1, but drawn to a larger scale. Part of the handwheel associated with this adjustment unit has been broken away for convenience in drawing.

By virtue of its accommodation in tab 151 and the top of the housing cap 56, clutch operating pin 148 is rotatable to either one of two positions: a "disengaged" position shown in Figs. 3 and 6, or an "engaged" position shown in Fig. 7. This rotation is accomplished by swinging clutch lever 155 between the stop lugs 157 and 158 located on top housing cap 56 (see Fig. 2). The effects of moving the clutch lever will be explained later.

Clutch adjusting pin 149 comprises a head portion 160 (see Fig. 7) which is also rotatably supported in housing cap's tab 51 (see Figs. 6 and 7), an eccentric portion 161 whose axis is displaced in relation to that of the head portion (see Fig. 7) and a threaded outer portion 162 having the screw slot 163 (see Fig. 3) in its end. The axis of this outer portion is concentric with that of head portion 160. Clutch adjusting pin 149 is held in position within housing cap 56 by means of the nut 164 (see Figs. 3 and 4).

Extending in circular fashion from bushing 153 on clutch operating pin 148 to eccentric, intermediate portion 161 of clutch adjusting pin 149 is the clutch band 165 (see Figs. 6 and 7). This band is provided at each end with the loop 166 through which bushing 153 and the clutch adjusting pin, respectively, pass, and also with the clutch lining 167 (also see Figs. 6 and 7) which is secured to the band in any convenient manner.

In adding housing cap 56 and its assembled clutch band to the earlier assembled parts, the housing cap rests upon the top of housing 52 (see Figs. 1, 4 and 6) where it is secured by a plurality of conveniently located screws 168 (see Figs. 3, 4, and 6 to 8) which pass through accommodating openings in the cap's flange 146 and thread into the housing's flange 91.

When the cap is so secured to housing 52, clutch lining 167 substantially encircles the sleeve's drum portion 135 (see Figs. 6 and 7), and the gear cage's shank 108 extends through opening 147 in the cap's top and extends somewhat beyond.

If clutch lever 155 is now moved to the "disengaged" position, toward lug 157 (see Fig. 3), eccentric portion 152 of clutch operating pin 148 is moved so as to shorten the arcuate distance around to the center of the adjusting pin's eccentric portion 161 (refer to Fig. 7). This action uncouples clutch lining 167 from the sleeve's drum portion 135 and, therefore, permits housing 52 and attached gun yoke 53 to be moved freely in either direction about the axis of post 50 and post adjunct 51 (see Fig. 6).

If clutch lever 155 is moved to the "engaged" position, i. e., toward lug 158 (refer to Figs. 3 and 7), the eccentric portion of clutch operating pin 148 is moved so as to increase the arcuate distance around to the center of the adjusting pin's eccentric portion. This action frictionally couples clutch lining 167 to the sleeve's drum portion so that housing 52 and sleeve 55 will rotate in unison only when shank 108 or shaft 123 is rotated. This action will be described later.

In order to allow compensation for the wearing away of clutch lining 167, the position of the clutch adjusting pin's eccentric portion 161 relative to the sleeve's drum portion 135 can be adjusted in well known manner by loosening nut 164 (see Fig. 3), turning slotted outer portion 162 of the pin the necessary amount by means of a screw driver, then retightening the nut.

Basic operation of horizontal adjustment unit

In order to facilitate rotation of gear cage 54, and the consequent rotation of housing 52 in either a clockwise or counterclockwise direction as viewed in Figs. 7 to 10, the handwheel 169 (see Figs. 1 to 4 and 6) is attached to the threaded upper end 109 of the gear cage's shank where it is secured as by means of the set screw 170 (see Fig. 6). For the purpose of excluding dirt and other foreign matter from inside the horizontal adjustment mechanism, the packing ring 171 (see Fig. 6) is interposed between the top of housing cap 56 and the bottom of the handwheel.

Similarly, to facilitate rotation of shaft 123 in either clockwise or counterclockwise direction as viewed in Figs. 7 to 11, that portion of the shaft which extends beyond handwheel 169 is provided with the knob 172 (see Figs. 1, 3, 4 and 6) which is secured in place by means of the pin 173 (see Fig. 6). For purposes similar to packing ring 171, the packing ring 174 (see Fig. 6) is interposed between the bottom of knob 172 and the top of handwheel 169.

Referring to Fig. 9, it will be apparent that, if pins 113 fixed in gear cage 54 (see Fig. 6) are moved in an orbital path clockwise about the axis of post adjunct 51 by clockwise rotation of handwheel 169 or knob 172 (see Fig. 3), planet gears 118, by their engagement with the adjunct's fixed internal ring gear 78, will rotate in a counterclockwise direction about their own axes. Since these gears are frictionally tight upon sleeves 117, the sleeves also will be caused to rotate in a counterclockwise direction about their axes.

Now, referring to Fig. 8, pins 113 will be seen to move in an orbital path clockwise about the axis of post adjunct 51 with sleeve drive gears 119, which also are frictionally tight with the sleeves, rotating in a counterclockwise direction.

From the description thus far, it might be expected that sleeve drive gears 119 would cause rotation of sleeve 55 in a counterclockwise direction. However, because the pitch diameter of the sleeve's internal gear teeth 139 is less than the pitch diameter of internal ring gear 78, plus the fact that pins 113 are moving orbitally in a clockwise direction and gears 118—119 carried thereby are rotating in a counterclockwise direction, the resultant direction of rotation of sleeve 55 will be in a clockwise direction, the same as the direction of rotation of the handwheel or the knob. Conversely if pins 113 are moved in an orbital path conterclockwise, by counterclockwise rotation of the handwheel or the knob, sleeve 55 will also rotate in a counterclockwise direction.

Those skilled in the mechanical arts realize the use of two pins 113, each having the associated sleeve 117, planet gear 118 and spindle drive gear 119, is entirely arbitrary. Actually, any convenient number more than one pin could be used.

SUPPORTING MOUNT

The foregoing portion of the description completes a discussion of the essential details of horizontal adjustment unit 35. This unit, as shown in Figs. 1 to 5 and 32, is attached to supporting tripod mount 36 now to be discussed.

This mount is shown in side elevation in Figs. 1 and 32, in partial side elevation in Figs. 28 and 31, in plan view in Fig. 2, in partial plan view in Figs. 3, 15, 27 and 30, and in partial vertical section in Figs. 4, 5 and 29.

Essentially, the mount comprises the horizontal, seat portion 180 (see Figs. 1 to 5, 15 and 32) from the center of which legs 181 (see Figs. 1 to 3, 15 and 27 to 29), 182 (see Figs. 2 to 4, 15 and 32), and 183 (see Figs. 1 to 4, 15 and 30 to 32) extend radially outward.

As shown in Figs. 2, 3 and 15 these legs are equally spaced from each other. In addition, legs 181 and 182 are similar in shape and construction but of opposite reference (i. e., leg 181 may be considered as the left leg, and leg 182 may be considered as the right leg).

Legs 181 and 182 in extending away from the mount's horizontal seat portion, slope upward (see Figs. 1, 28, 29 and 32) until, near their outer ends, each changes direction and terminates in the horizontally extending end portion 184 (see Figs. 1, 2, 27 to 29 and 32). Projecting downward from the end portion of each of those legs is the riser 185 (see Figs. 1, 28, 29 and 32). The free ends of these risers terminate somewhat below the tripod's seat portion 180 (see Figs. 1 and 32) in an imaginary plane parallel to that portion.

Leg 183, in extending away from the mount's horizontal seat portion, slopes downward (see Figs. 1, 31 and 32) until, near its outer end, it changes direction and terminates in the horizontally extending end portion 186 (see Figs. 1, 2 and 30 to 32). This end portion, as shown in the last named figures, is provided with the foot 187 which, later, positions leg 183 in jeep 47, if the mount be so borne (see Figs. 1, 2, 30 and 31); or which rests upon the ground (not shown), if the mount be used in that fashion (see Fig. 32). From Figs. 1 and 32 it will be evident that the bottom of foot 187 terminates in the same imaginary plane as the bottoms of risers 185.

In order to provide for easily and rapidly attaching or detaching tripod 36 to jeep 47, or other carrier, arms 181 and 182 are each equipped with the clamp 190 (see Figs. 1, 2, 27 to 29, and 32). Both clamps are substantially identical, therefore a description of one will suffice for both. Each clamp is secured to the paired, spaced lugs 191 and to the lug 192 (see Figs. 28 and 29) which are affixed, as by welding, to the undersurface of legs 181 and 182 at opposite ends of the oblong opening 193 therethrough. Each clamp comprises, basically, the somewhat L-shaped operating lever 195 (see Figs. 1, 2, 27 to 29 and 32), the jaw 196 (see Figs. 28 and 29), and the connecting links 197 (see Figs. 1 and 27 to 29).

Operating lever 195 has the legs 198 and 199 (see Figs. 28 and 29). The end of leg 198 is bifurcated (also see Fig. 27), and is pivotally attached to lug 192 by means of the pin 200 which is retained in place by any convenient means, such as a cotter pin. Leg 199 of the operating lever extends upward through the leg's oblong opening 193 where it terminates in the handle portion 201 (see Figs. 1, 2, 27, 28 and 32).

Jaw 196 comprises the plate portion 202 having the integral gripping portion 203 (see Figs. 28 and 29) which is conveniently shaped for engaging that portion of the jeep to which the tripod is clamped. This jaw is pivotally mounted between the spaced, paired lugs 191 by means of the pin 204 (see Figs. 28 and 29) so that the gripping portion is movable toward or away from the respective leg's undersurface.

Connecting links 197 (see Figs. 28 and 29) span the space between operating lever 195 and jaw 196 to which members the respective ends of the links are connected by the pins 205 (see Figs. 28 and 29).

In operation, clamp 190 is capable of assuming either one of two positions: a "closed and locked" position shown in Figs. 1, 2, 27 and 28 in which position jaws 196 grip a portion of the jeep's body (not shown), or an "open" position shown in Fig. 29 in which position the jaws have released their grip on the jeep's body so that the tripod and its attached gun aiming mechanism with associated trigger release means can be easily removed from the jeep and set upon the ground (see Fig. 32) or in an emplacement.

Each clamp is held in the "closed" position by means of the lock 206 (see Figs. 27 to 29) which is attached in convenient manner as by the screws 207 (see Fig. 27) to the plate 208 atop legs 181 and 182 (see Figs. 2, 27 to 29 and 32).

Each lock comprises the housing 210 (see Figs. 2 and 27 to 29) in which the latch 211 (see Figs. 27 to 29) is slidably supported. This latch is caused to move inside the housing or is allowed to project from the housing depending upon the position of the cam 212 (see Figs. 28 and 29) which is attached to the lever 213 (see Figs. 27 to 29) and is pivotally attached to latch 211. When operating lever 195 is in the "closed" position (see Figs. 27 and 28), latch 211 engages an accommodating recess (not shown) in the lever's handle portion 201 and thereby prevents that lever from being moved to the "open" position until the latch is released.

The latch is released for allowing the clamp to be moved to the "open" position by simply moving lever 213 downwardly toward the respective arm thereby revolving cam 212 and causing the latch to be disengaged from the operating lever and moved within housing 210. When that is done, operating lever 195 can then be pulled upward to place the clamp in the "open position."

Each clamp is held in the "open" position by means of the leaf spring 215 (see Figs. 27 to 29) one of which is attached, as by the screws 216 (see Fig. 27), to the top surface of legs 181 and 182. When the respective operating lever 195 is moved to the "open" position (see Fig. 29) the respective spring 215 snaps under the lug 217 projecting from the side of operating lever (see Figs. 27 and 28) and prevents the operating lever from dropping back into the "locked" position; however, the operating lever can be easily returned to the "closed" position by merely pushing downwardly on its handle portion 201.

As shown in Figs. 1, 4, 5 and 32, horizontal adjustment unit 35 rests upon the tripod's seat portion 180 which is internally reinforced by the fitting 220 (see Figs. 4, 5 and 15) secured within the tripod as by the rivets 221 (see Figs. 4 and 15). The horizontal adjustment unit is located upon the tripod by means of the post's axial boss 63 which projects downward from the undersurface of the post's flange 62 and is accommodated in the opening 223 formed in the central portion of the tripod's seat (see Figs. 4 and 5). This assembly is then secured by means of the screws 224 conveniently spaced around the post's flange (see Figs. 4, 5 and 15) which pass through the seat portion and its fitting 220, and thread into flange 62 (see Fig. 5).

Where it is desirable to have a weapon which can be easily attached to some type of carrier, especially a land vehicle, or quickly detached therefrom and used upon the ground, total lightness in weight of the gun and all its appurtenances is highly important. This lightness in weight, however, must not be accomplished at the expense of strength and rigidity of the gun's mount, or of other basic requirements relative to other equipment associated with the gun.

Among the novel features of my tripod mount is the exceptional strength and rigidity obtained in relation to its weight. Prior art mounts of comparable strength are so ponderous as to prevent their being readily lifted into or out of a jeep, or other carrier, as can be done with my mount.

Actually, of course, my horizontal adjustment unit could be attached to any convenient supporting mount other than the one shown. The particular advantage, however, of my tripod mount is that, by its use, the scope of utility of the aiming mechanism and the attached firearms is greatly broadened.

It will be noted that post 50 and, therefore, the entire horizontal adjustment unit, is attached to the tripod mount and may be considered as being fixed. Post adjunct 51 and the elements attached thereto, then, are also fixed. However, housing 52 which contains gun yoke 53 is rotatable in either clockwise or counterclockwise direction, as viewed in Fig. 3. The housing is rotatable when clutch lever 155 is in the "disengaged" position, but also is rotatable as a result of rotating handwheel 169 or knob 172 when the clutch lever is in the "engaged" position.

VERTICAL ADJUSTMENT UNIT

Vertical adjustment unit 37 is used, in a manner to be described later, to move the barrel of the recoilless rifle and its attached spotting rifle angularly up or down, relative to the target, or other reference point, in an imaginary plane perpendicular to the supporting mount's seat portion 180 (compare the position of the rifles' barrels in Figs. 1 and 32). As earlier mentioned, the construction and the principle of operation of this adjustment unit are similar to those of the previously described horizontal adjustment unit. During the succeeding description of the vertical adjustment unit, various points of analogy to the horizontal adjustment unit will be pointed out.

Vertical adjustment unit 37 is supported by the gun yoke's large and small pillow blocks 94 and 95 respectively, and is shown in end view in Figs. 1, 17 and 32, in plan view in Figs. 2 and 16, in side view in Fig. 18, in longitudinal, vertical cross-section in Fig. 19, and in transverse, vertical cross section in Figs. 24 to 26.

The principal components of the vertical adjustment unit, from the standpoint of basic structure are: the spindle 230, the spider 231, the cover plate 232 and the gun ring 233. The essential details of these components, in succession, follow.

Spindle

Spindle 230 is shown in partial plan view in Figs. 16 and 20, in end view in Fig. 17, in partial side view in Fig. 18, in longitudinal, vertical cross-section in Fig. 19, in partial horizontal cross-section in Figs. 21 and 21A, and in transverse, vertical cross-section in Figs. 22, 23 and 26.

This spindle comprises the bowl portion 234 (see Figs. 16, 18, 19 and 26) having the outwardly extending flange 235 at its open end (see Figs. 16, 18 and 19), and the axially located shank 236 (see Figs. 16 to 23).

Exteriorly, bowl portion 234 is provided with the tongue 237 (see Figs. 16, 18 and 19) which is formed diametrically across that portion's bottom 238 (see Figs. 16 and 18), and with the axially located lug 239 (see Fig. 19) which carries the thread 240 at the distal end of the bowl portion (also see Figs. 20 to 21A).

Interiorly, bowl portion is provided with the gear teeth 241 which are formed around its open end (see Figs. 19 and 26), with the axially located bushing 242 (see Fig. 19) which is secured in place in usual manner, and with the conveniently located sealing member 243 (also see Fig. 19).

Shank 236 extends axially away from the threaded end of lug 239 (see Fig. 19), is of somewhat lesser diameter than that lug, and is provided with the axial opening 244 (see Figs. 19 and 21 to 22). More details of the shank will be given later when trigger release mechanism 38 is described.

When assembled into gun yoke 53, the free end of the spindle's shank 236 is rotatably supported in the bushing 335 located in the gun yoke's small pillow block 95 (see Figs. 16 to 19), and the spindle's flanged bowl portion 234 is rotatably supported in bushing 331 located in the yoke's large pillow block 94 (also see Figs. 16 to 19). Note, especially in Fig. 19, that flanged bushing 331 limits the amount of the spindle's insertion by abutting the bowl portion's flange 235.

In comparing the vertical adjustment unit's spindle 230 with the horizontal adjustment unit's sleeve 55, these members are similar in that, by rotation of the spindle about its axis, the gun is adjusted in the vertical reference plane; and, that by rotation of the sleeve about its axis, the gun is adjusted in the horizontal reference plane.

Spider

Spider 231 is shown in longitudinal, vertical cross-section in Fig. 19 and in transverse vertical cross-sections in Figs. 24 and 26.

This spider, like the horizontal adjustment unit's gear cage 54, comprises the outer plate 245 (see Figs. 19 and 24) and the inner plate 246 (see Figs. 19 and 26). These plates have substantially the same size and shape, in area, (see Figs. 24 and 26) and are held in parallel, spaced relationship by means of the posts 247 (see Fig. 26) which are integral with the spider.

Projecting to the left from outer plate 245 (see Fig. 19) is the axial hub upon which the sealed bearing 248 is mounted in usual manner, and upon which the thread 249 is formed at the outer end.

Projecting to the right from inner plate 246 (also see Fig. 19) is to the hub upon which the bushing 250 is mounted in any convenient manner.

Extending between the spider's spaced inner and outer plates, parallel to the spider's aligned hubs and equally spaced from each other are the pins 255 (see Figs. 19 and 24 to 26) which are secured in place as by pins or set screws (not shown).

Rotatably mounted upon each pin through the intermediary bushings 256, which are separated by the spacer 257 (see Fig. 19), is the sleeve 258 (see Figs. 19, 25 and 26).

Frictionally tight upon the inner portion of each sleeve is the spindle drive gear 259 (see Figs. 19 and 26), and also frictionally tight upon the outer portion of each sleeve is the cover plate gear 260 (see Figs. 19, 24 and 25). Gears 259 and 260 are conveniently spaced from the spider's inner and outer plates, respectively, by means of the washers 261 (see Fig. 19).

A very important relationship exists between the pitch diameters of these gears, namely, the pitch diameter of cover plate gears 260 is slightly greater (by approximately 0.004″ in the present instance) than the pitch diameter of spindle drive gears 259. Another feature which is worthy of restatement is that cover plate gears 260 and spindle drive gears 259 are only frictionally tight upon their respective sleeves. As with horizontal adjustment unit 35, this condition provides an overload feature to the vertical adjustment unit, and eliminates the possibility of damage to that adjustment unit's components.

Extending axially through spider 231 in which it is rotatably supported at the outer end by the bushing 262 (see Fig. 19) and at its inner end by the spindle's recess 244 is the shaft 264 (see Figs. 16 and 18 to 25). As will be shown later, this shaft is allowed limited axial movement which results from its attachment to trigger release mechanism 38. Near its inner end shaft 264 is provided with the splined portion 267 (see Figs. 19, 25 and 26) upon which the sun gear 263 is matingly accommodated. As also shown in Fig. 19, the sun gear's hub is supported by the bushing 265 located in the spider's lower plate 246; and, as shown in Figs. 19 and 26, the sun gear's teeth mesh with each of spindle drive gears 259. The sun gear is spaced from the spider's inner plate 246 by means of the washer 268 and is retained in engagement with the spindle drive gears by means of the tubular spacer 269 (see Figs. 19 and 25).

Note in Figs. 19 and 25 that there is no engagement between cover plate gears 260 and shaft 264.

In adding the spider-shaft sub-assembly to spindle 230, the spider is spaced from the bottom of the spindle's bowl portion 234 by means of the bearing washer 270 (see Fig. 19) and the spider's bushing 250 is rotatably accommodated in the spindle's bushing 242 which supports the inner end of the spider. In addition, spindle drive gears 259 enmesh with the spindle's internal gear teeth 241 (see Figs. 19 and 26).

By comparing Figs. 6 and 9 it can be seen that gear cage 54 together with its planet gears 118, sleeve drive gears 119, shaft 123, and sun gear 128, bears close resemblance to spider 231 with its spindle drive gears 259, cover plate gears 260, shaft 264, and sun gear 263. These parts are alike, in the operation of my invention, in that rotation of gear cage 54, by means of handwheel 169 or knob 172, causes rotation of sleeve 55 in the same direction; and that rotation of spider 231, by means of handwheel 280 or knob 284, causes rotation of spindle 230 in the same direction. However, as will be evident later, the turn ratios in the respective units are different. Gear cage 54 and spider 231 are also different in that the spider's shaft 264 is adapted for axial movement, in addition to rotational, for the purpose of operating trigger release mechanism 38 later to be discussed.

*Cover plate*

Cover plate 232 is shown in top view in Figs. 2 and 16, in end view in Fig. 18, and in vertical cross-section in Figs. 19 and 24. This cover plate is a rather shallow, dished member (see Fig. 19) having the external flange 275 at its open end (see Figs. 16, 18, 19 and 24) and an axial boss 276 at the opposite end (see Figs. 16, 18, and 19). Internally, around its flanged end, the cover plate is provided with the gear teeth 277 (see Figs. 19 and 25).

At assembly, the cover plate is secured to the outer face of large pillow block 94 by the screws 278 (see Figs. 16, 18, 19, 24 and 26) which pass through cover plate's flange 275 and thread into the pillow block.

When so assembled, the spider's sealed bearing 248 is accommodated in a recess inside the cover plate's axial boss which thereby rotatably supports the spider's outer end, and the spider's cover plate gears 260 enmesh with internal gear teeth 277 inside the cover plate. Interposed between the outer surface of the spindle's bowl portion and the inner surface of cover plate 232 is the spacer 279 (see Figs. 16, 18 and 19).

Thus, cover plate 232 secures the assembly of the vertical adjustment unit. The cover plate is analogous to post adjunct 51 in that both those members are fixed against rotation and both contain a fixed internal ring gear (i. e. gear teeth 277 in the cover plate—see Fig. 25; and ring gear 78 in the post adjunct—see Fig. 9). In vertical adjustment unit 37, rotation of spindle 230 is derived from gear teeth 277; and, in horizontal adjustment unit 35, rotation of sleeve 55 is derived from internal ring gear 78.

*Basic operation of vertical adjustment unit*

In order to facilitate rotation of spider 231 in either a clockwise or a counterclockwise direction, as viewed in Figs. 24 and 26, for the purpose of increasing or decreasing the guns' angular adjustment in the imaginary vertical plane, the handwheel 280 (see Figs. 1, 2, 16 to 19, and 32) is attached to the spider's threaded outer end which projects through the cover plate. This handwheel is secured in place by means of the lock cap 282 (see Figs. 16, 18 and 19) having a central opening for allowing passage therethrough of shaft 264 (see Fig. 19).

Between the outer end of spider 231 and the inside of lock cap 282 is the packing ring 283 (see Fig. 19) which excludes dirt and other foreign matter from inside the vertical adjustment at that location.

Knob 284 (see Figs. 2 and 18), which is secured in any convenient manner to the shaft's outer end, is provided in order to serve a number of purposes. It facilitates clockwise or counterclockwise movement of shaft 264 (as viewed in Figs. 22 to 25) so as to increase or decrease the guns' angular adjustment in a vertical reference plane (to a lesser extent than can be accomplished by handwheel 280), and facilitates pulling out or pushing in the shaft for the purpose of firing the major gun or the spotting rifle.

Referring to Fig. 25 it will be apparent that if pins 255, fixed in spider 231, are moved in an orbital path clockwise about the axis of cover plate 232 by clockwise rotation of handwheel 280 or knob 284 (see Fig. 18), cover plate gears 260 by their engagement with the cover plate's fixed, internal gear teeth 277, will rotate in a counterclockwise direction about their own axes. It should be noted that these gears are frictionally tight upon sleeves 258, so the sleeves also rotate in a counterclockwise direction about their axes.

Now, referring to Fig. 26, we have pins 255 moving in an orbital path clockwise about the axis of spindle 230 with spindle drive gears 259, which also are frictionally tight upon sleeves 258, rotating in a counterclockwise direction.

From the description thus far it might be expected that spindle drive gear 259 would cause rotation of spindle 230 in a counterclockwise direction. However, because the pitch diameter of the spindle's internal gear teeth 241 is less than the pitch diameter of the cover plate's fixed internal gear teeth 277, plus the fact that pins 255 are moving orbitally in a clockwise direction and gears 259 carried thereby are rotating in a counterclockwise direction, the resultant direction of rotation of sleeve 230 will be in a clockwise direction, the same as the direction of rotation of the handwheel or the knob. Conversely, if pins 255 are moved in an orbital path counterclockwise, by counterclockwise rotation of the handwheel or the knob, spindle 230 will also rotate in a counterclockwise direction.

Those skilled in the mechanical arts realize that the use of four pins 255, each having associated sleeve 258, spindle drive gear 259 and cover plate gear 260, is entirely arbitary. Actually, any convenient number more than one pin could be used.

Gun ring

Gun ring 233 is shown in side view in Figs. 1, 17 and 32, in partial side view in Figs. 24 and 26, in top view in Figs. 2 and 16, in end view in Fig. 18, in partial horizontal cross-section in Figs. 20 and 21, and in partial vertical cross-section in Fig. 19.

This ring comprises, essentially, the gun encircling portion 285 (see Figs. 1, 2, 16 to 19, 24, 26 and 32) from diametrically opposite sides of which the large tab 286 (see Figs. 16 to 19) and the small tab 287 (see Figs. 17 to 21) project downward in parallel, spaced relationship to each other (see Figs. 18 and 19). Formed in the outside surface of the large tab is the diametrically extending groove 288 (see Figs. 16, 18 and 19).

In assembly, the gun ring fits upon that portion of spindle 230 which is rotatably supported between the large pillow block's bushing 331 and the small pillow block's bushing 335 (see Figs. 18 and 19). The assembled relationship between the spindle and the gun ring is best shown in the latter figure where it can be seen that the spindle passes through accommodating concentric openings in the large and small tabs 286–287, respectively.

In fitting upon spindle 230, gun ring 233 is coupled to the vertical adjustment unit's spindle so as to rotate in unison therewith by mating engagement between the groove 288 on gun ring tab 286 and the spindle's tongue 237 (see Figs. 16, 18 and 19). The gun ring and the spindle are then secured together by means of the lock washer 289 (see Figs. 17 to 19) and the locknut 290 (see Figs. 17 to 21A). For proper bearing and spacing between the outer face of small tab 287 and the inner face of small pillow block 95, the packing ring 291 is provided as a matter of course (see Figs. 16, 18 and 19).

It can be seen from Figs. 1, 2, 16 to 19, 24, 26 and 32 that gun ring 233 accommodates recoilless rifle 39 which passes through the ring's gun encircling portion 285, and is secured therein in any convenient manner (not shown). By virtue of its association with the gun ring which, with spindle 230, is rotatable in a clockwise or counterclockwise direction as viewed in Figs. 1, 17, 24, 26 and 32, the rifle's barrel can be raised or lowered in a vertical reference plane.

TRIGGER RELEASE MECHANISM

Trigger release mechanism 38 is used to cause independent firing of recoilless and spotting rifles 39 and 40 respectively and, as will presently be shown, is operated by pushing in or pulling out on the vertical adjustment unit's shaft 264.

The trigger release mechanism can be seen in side view in Figs. 1, 17 and 32, in end view in Fig. 18, in vertical section in Figs. 19, 22 and 23, and in horizontal cross section in Figs. 20, 21 and 21A.

This mechanism comprises one active element, the walking beam 295 (see Figs. 19 to 23), which is enclosed within the boxlike housing 296 (see Figs. 17 to 23) that comprises the upper member 297 (see Figs. 17 to 23) and the lower member 298 (see Figs. 17 to 21, 22 and 23).

Walking beam 295 consists of the bar-like base portion 299 (see Figs. 20 to 23), having the rounded ends 300 and 301 (see Figs. 20 to 21A), from one side of which base portion the arm 302 projects outward (see Figs. 20 to 23).

In each rounded end of the base portion is the spherical bottomed recess 303 (see Figs. 21 and 21A). In one recess is placed the ball 304 (see Figs. 21, 21A and 22) forming the terminal of flexible cable 42; and in the other spherical recess is placed the ball 305 (see Figs. 21 and 21A) forming the terminal of flexible cable 45. Access into each spherical bottomed recess 303 for the purpose of easily attaching the cables is provided by the slit 306 (see Figs. 21 and 21A and 22) which is formed in each end of the base portion. Each slit is slightly greater in width than the diameter of the respective cable and extends a sufficient distance into each recess to also allow proper movement, later to be described, of the walking beam.

Arm 302 is conveniently shaped along its length only for the purpose of permitting the walking beam's proper movement within housing 296, after later assembly to the vertical adjustment unit's shaft 264, and is provided at the free end 307 (see Figs. 21, 21A and 23) with the groove 308 (see Figs. 19, 21, 21A and 23).

Box-like housing 296, comprising upper member 297 and lower member 298, respectively, will for simplicity, be considered with those two members assembled together. These members are secured together by means of the screws 310 (see Figs. 17 to 23). When so assembled together an arcuate groove 311 in the upper member (see Figs. 22 and 23) becomes continuous with the arcuate groove 312 in the lower member (also see Figs. 22 and 23) to define a cylindrical opening 313 (see Figs. 19 to 23) through the housing.

The upper and lower members are substantially equivalent in area as viewed from above (see Figs. 20 and 21) but upper member 297 is provided with the threaded lugs 314 and 315, respectively (one or both of which are shown in Figs. 17, 18 and 20 to 23). As is usual practice, a threaded coupling (not shown) on cable housing 43 (Figs. 1, 32) is attached to lug 314, and another threaded coupling (not shown) on cable housing 46 (Figs. 1, 32) is attached to lug 315, but for simplicity these couplings and the housings are not shown in the drawings. However, the flexible cables contained in the respective cable housings are shown (see Figs. 1, 18 and 20 to 21A).

Additionally, upper member 297 is provided with the recess 316 (see Figs. 20 to 23) in which walking beam 295 is pivotably accommodated. This recess comprises the straight side 317 (see Figs. 20 to 21A), the long arcuate side 318 (see Figs. 20 to 21A), and the short arcuate side 319 (also see Figs. 20 to 21A). This recess, as shown in these figures and also in Figs. 22 and 23, interrupts the housing's cylindrical opening 313 so that free end 307 of the walking beam's arm 302 extends into that opening for a considerable distance.

At assembly to vertical adjustment unit 37, box-like housing 296, by virtue of its cylindrical opening 313, fits around shank portion 236 of that adjustment unit's spindle 220 to which it is coupled by the key 320 (see Fig. 23), one of the screws 310 (see Figs. 21 and 22), and tapered pin 321 (see Fig. 21).

When properly assembled, the walking beam's arm 302 extends through the elongated slot 322 (see Figs. 21, 21A and 23) in the shank's sidewall, and the beam's free end 307 by virtue of its groove 308 matingly fits into the circumferential groove 323 near the inner end of shaft 264 (see Figs. 19, 21, 21A and 23). In addition, long and short arcuate sides, respectively, of the housings's recess 316 become aligned and continuous with the short and long arcuate sides 324 and 325, respectively, of, a groove formed across the spindle's shank portion (see Figs. 21 and 21A).

In operation of trigger release mechanism 38, walking beam 295 is capable of assuming one of three different positions: a "neutral" position best shown in Fig. 20, a "first" firing position toward which the walking beam has moved part way in Fig. 21, and a "second" firing position toward which the walking beam has moved part way in Fig. 21A.

The walking beam is constantly urged to the "neutral" position by a well-known means (not shown) forming part of trigger mechanisms 41 and 44 of recoilless and spotting rifles respectively. Notice, in Fig. 20, that when the walking beam is in the "neutral" position, the beam's base portion 299 lies against straight side 317 of the housing's recess 316.

The beam is moved to the "first" firing position (refer to Fig. 21 which shows partial movement in that direction) by pushing inwardly (i. e. from left to right) on the vertical adjustment unit's shaft 264. Because of the engagement between the beam's arm 302 and the shaft's groove 323 the beam pivots about its right end 301 thus moving its left end 300 toward the shaft's axis and causing the beam to pull on cable 42. The opposite end of this cable is attached to trigger mechanism 41 of recoilless rifle 39, so that the rifle is fired as a consequence of pushing in on shaft 264. As soon as the push is released, the walking beam returns to the "neutral" position.

The beam is moved to the "second" firing position (refer to Fig. 21A which shows partial movement in that direction) by pulling outward (i. e. from right to left) on shaft 264. This action causes the beam to pivot about its left end 300 thus moving the right end 301 toward the shaft's axis and causing that end of the beam to pull on cable 45. The opposite end of this cable is attached to trigger mechanism 44 of spotting rifle 40 so that the spotting rifle is fired as a consequence of pulling out on the shaft. As soon as the pull is released, the walking beam returns to the neutral position.

Operatively associating trigger release mechanism 38 with the vertical adjustment unit's shaft is a particularly novel feature of my invention because it eliminates the necessity for two additional operating members.

Due to the manner in which the trigger release mechanism is attached to the vertical adjustment unit's shaft, that mechanism moves in unison with the recoilless rifle and its attached spotting rifle at all times. Because of this fact, there is no necessity to have extra "slack" in the lengths of cables and cable housings since the distance from housing 296 to the rifles' trigger mechanisms remains constant at all times.

Although the trigger mechanisms of both the recoilless and spotting rifles are controlled by movement of the vertical adjustment unit's shaft 264, it is possible to fire either the recoless rifle or the potting rifle independently of each other, i. e. either rifle can be fired in any order, any desired number of times.

OPERATION

Having described the components of my novel aiming mechanism and associated trigger release mechanism with supporting mount, the operation thereof will now be explained. In essence, the operation of my invention resolves itself into simple steps: first, the aiming of recoilless rifle 39 and its attached spotting rifle 40 which moves in unison therewith; second, the independent firing of either rifle in any desired succession.

Since, in the illustrative embodiment of my invention here discussed, recoilless rifle 39 is obviously the principal weapon, the operation of my aiming mechanism will be predicated upon the aiming of that rifle.

It may be assumed, for purpose of explanation, that the plane of the tripod's seat portion is horizontal. In actual use, however, the plane of the tripod's seat portion may be other than strictly horizontal, depending upon a number of variable factors, without seriously affecting the aiming operation or making it necessary to correct the deviation from the horizontal.

Aiming the recoilless rifle in the horizontal reference plane amounts to swinging the rifle's muzzle from left to right, or vice versa, as viewed from the rifle's breech, about the rotational axis of the horizontal adjustment unit which happens to be the axis of post 50 and the attached post adjunct 51.

Aiming the recoilless rifle in the horizontal reference plane can be accomplished in three ways: first by moving clutch lever 155 to its "release" position, then freely moving gun yoke 53 in the desired clockwise or counter-clockwise direction, as viewed in Figs. 2, 3 and 7 to 12, about post 50 and post adjunct 51 fixed to tripod mount (movement of the gun yoke results in angular movement of the recoilless rifle in a horizontal reference plane); second, by rotation of handwheel 169 (see Figs. 1, 3 and 4); or third, by rotation of the horizontal adjustment unit's knob 172 (see Figs. 1, 3 and 4).

Regarding the first-named manner of aiming the recoilless rifle in the horizontal reference plane, it was earlier pointed out that housing 52 rotatably "floats" upon post 50 and post adjunct 51 when the horizontal adjustment unit's clutch lever 155 is in its "disengaged" position. Therefore, housing 52 can be freely rotated in relation to the other elements of that adjustment unit which are secured or coupled to tripod mount 36. As housing 52 is rotated, for example, in a clockwise direction as viewed in Figs. 8 to 12, gun yoke 53 attached thereto also moves in that direction. Similarly, gun ring 283 bearing the recoilless rifle also is carried in the same direction. As a result, then, clockwise rotation of housing 52 will result in angular movement of the rifle's muzzle in the same direction in the horizontal reference plane. Conversely, counterclockwise rotation of housing 52 will result in angular movement of the gun's muzzles in that direction. This means of adjustment is for moving the gun's muzzle quickly through a very wide angular range of adjustment.

It was earlier shown that rotation of the handwheel 169 and knob 172 was so integrated by the horizontal adjustment unit's gearing that rotation of either one of those members would result in co-directional rotation of the other member. However, because of that adjustment unit's gearing, the turn ratio between those members is approximately 7 to 1, i. e., approximately seven revolutions of knob 172 result in only one revolution of handwheel 169, or vice versa.

It was also earlier pointed out that rotation of the handwheel or knob also causes co-directional rotation of the adjustment unit's housing and attached gun yoke 53 when clutch lever 155 is in the "engaged" position.

The turn ratio between handwheel 169 and housing 52 is approximately 175 to 1. In practice this means that approximately one-half revolution of the handwheel will result in approximately 1° angular movement of the gun muzzle in the same direction in the horizontal reference plane. On the other hand, the turn ratio between knob 172 and housing 52 is approximately 1200 to 1. This means that approximately 3⅓ revolutions of the knob will result in approximately 1° angular movement of the guns' muzzles in the same direction. It is because of these relationships that handwheel 169 is useful as a "coarse" adjustment (i. e. for moving the gun rapidly through a wide angular range) and that knob 172 is useful in a "fine" adjustment (i. e. for moving the gun's muzzle slowly through a small range).

Aiming the recoilless rifle in a vertical reference plane can be accomplished in two ways: first, by rotation of the vertical adjustment unit's handwheel 280 (see Figs. 1, 2, 16 to 19 and 32); second, by rotation of that adjustment unit's knob 284 (see Figs. 2 and 18). Because of weight and gravity considerations, however, no free moving adjustment similar to that provided in the horizontal adjustment unit (by operation of clutch lever 155) is available in the vertical adjustment unit.

It was earlier shown that the rotation of handwheel 280 and knob 284 was so integrated by the vertical adjustment unit's gearing that rotation of either one of those members would result in codirectional rotation of the other member. However, because of the adjustment unit's internal gearing, the turn ratio between those members is approximately 5 to 1, i. e., five revolutions of knob 284 result in only one revolution of handwheel 280 or vice versa.

It was also earlier pointed out that rotation of the handwheel or the knob also causes co-directional rotation of the adjustment unit's spindle 230 which, further, carries gun ring 233, the attached recoilless rifle 39 and the accompanying spotting rifle 40. Therefore, referring to Figs. 1, 17 and 32, rotation of handwheel 280 (or knob 284, not there shown) in a counterclockwise direction would result in counterclockwise rotation, in other words, elevation of the guns' muzzles. Conversely, rotation of handwheel 280 (or knob 284) in a clockwise direction, as viewed in the same figures, would result in clockwise rotation, in other words, depression of the guns' muzzles.

The turn ratio between handwheel 280 and spindle 284 is approximately 520 to 1. In practice this means that approximately 1.4 revolutions of the handwheel will result in 1° elevation or depression of the guns' muzzles, depending upon the direction of rotation of the handwheel. On the other hand, the turn ratio between knob 284 and spindle 230 is approximately 2500 to 1. This, reduced to practical significance, means that approximately 7 revolutions of the knob will result in 1° elevation or depression of the guns' muzzles, again depending upon the direction of rotation of the knob. It is because of these relationships that handwheel 280 can be used as a "coarse" adjustment (i. e., moving the guns rapidly through a wide angular range), and that knob 284 can be used as a "fine" adjustment (i. e., for moving the guns slowly through a small angular range).

After the gun aiming process is completed, firing is accomplished by pushing inwardly (i. e. moving from left to right in Figs. 18 to 21) or pulling outwardly (i. e. moving from right to left in Figs. 18 to 21A) the vertical adjustment unit's shaft 264 through the agency of its knob 284.

If it is desired to fire spotting rifle 40 in order to check the accuracy of aiming, knob 284 is pulled outwardly. Through the connection between shaft 264 and walking beam 295, the walking beam is moved to exert a pull on cable 45 (compare Figs. 20 and 21A) which is connected to trigger mechanism 44 (see Figs. 1 and 32) of the spotting rifle. This action causes that gun to be fired. Firing of the spotting rifle can be repeated any desired number of times.

If, after aiming, it is desired to fire recoilless rifle 39, knob 284 is pushed inwardly. Through the association of shaft 264 and walking beam 295, the walking beam is moved to exert a pull on cable 42 (compare Figs. 20 and 21) which is connected to recoilless rifle's trigger mechanism 41 (see Figs. 1 and 32). This action causes that gun to be fired. Firing of the recoilless rifle can also be repeated any desired number of times.

Any change necessary in aiming the guns can be made at any time independently of the firing operation.

From the foregoing it will be apparent that I have simplified the design and construction of aiming mechanisms by minimizing the number and complexity of components contained therein, and by minimizing the number of external parts required for the actual operation of those mechanisms; that I have facilitated the operation of aiming mechanisms by locating the external elements required for operation of the aiming mechanism within easy reach of the gunner, and by having the direction of movement of those parts the same as the resultant direction of movement of the supported weapon in the horizontal and vertical reference planes, respectively; that I have provided an aiming mechanism having an operatively associated, but independently functioning, trigger release mechanism; and that I have provided a dual purpose mount for supporting the aiming mechanism and its associated trigger release mechanism.

Those skilled in the art realize that my invention is amenable to numerous variations and modifications without departing from its original spirit and scope. For that reason, I do not want my invention to be defined by the narrow confines of the embodiment here described for illustrative reasons only, but rather by the metes and bounds of the appended claims.

I claim:

1. A mechanism for adjustably positioning a gun in an imaginary reference plane, such mechanism comprising: a central post having internal ring gear teeth formed therein; a sleeve rotatably supported in said post and also having other internal ring gear teeth formed therein, said sleeve's internal ring gear teeth being axially aligned with and juxtaposed to said post's internal ring gear teeth; a gear cage extending between and rotatably supported by said post and said sleeve in axial coincidence therewith; an externally toothed gear carried by said gear cage and rotatable therein upon an axis parallel, but eccentric, to the common axis of said post's and said sleeve's respective internal ring gear teeth, said externally toothed gear being in mesh with said post's and sleeve's internal ring gear teeth; a housing rotatably supported on said post and adapted to carry the gun; and selectively operable coupling means between said sleeve and said housing; whereby the gun can be adjustably positioned in an imaginary reference plane by rotation of said gear cage when said coupling means is engaged, and whereby the gun can also be adjustably positioned by rotation of said housing when said coupling means is disengaged.

2. The mechanism of claim 1 additionally provided with a support means for the post.

3. The mechanism of claim 2 additionally provided with a means for rotating the gear cage.

4. A mechanism for adjustably positioning a gun in an imaginary reference plane, such mechanism comprising: a central post having internal ring gear teeth formed therein coaxial to said post; a support for said post; a sleeve rotatably supported in said post and also having internal ring gear teeth formed therein axially aligned with and juxtaposed to said post's internal ring gear teeth; a gear cage extending between and rotatably supported by said post and said sleeve in axial coincidence therewith; an externally toothed gear carried by said gear cage and rotatable therein upon an axis parallel, but eccentric, to the common axis of said post's and said sleeve's respective internal ring gear teeth, said externally toothed gear being in mesh with said post's and with said sleeve's internal ring gear teeth; a shaft axially aligned with said gear cage and rotatable with relation thereto, said shaft having external gear teeth formed therein and in engagement with said externally toothed gear; a housing rotatably supported on said post and adapted to carry the gun; selectively operable clutch means between said sleeve and said housing; and a handwheel on said gear cage for causing the cage's rotation; whereby the gun can be adjustably positioned in an imaginary reference plane in any one of the three following manners: first, by rotation of said gear cage when said clutch means is in engagement; second, by rotation of said shaft also when said clutch means is in engagement; and third, by rotation of said housing when said clutch means is disengaged.

5. The mechanism of claim 4 additionally provided with a means for rotating the shaft.

6. A mechanism for adjustably positioning a gun in an imaginary reference plane, such mechanism comprising: a central post; a support for said post; a post adjunct secured to said post in coaxial relationship thereto; an internal ring gear secured to said post adjunct in coaxial relationship therewith; a sleeve rotatably supported in said post adjunct and also having internal ring gear teeth formed therein, said sleeve's internal ring gear teeth being axially aligned with and juxtaposed to said internal ring gear's teeth but said sleeve's internal ring gear teeth being of lesser pitch diameter than said internal ring gear's teeth; a gear cage extending between and rotatably supported between said post adjunct and said sleeve in axial coincidence therewith; diametrically opposed pins secured in said gear cage, the axes of said pins being parallel, but eccentric, to the common axis of said internal ring gear and of said sleeve; a bushing rotatably mounted on each of said pins; a first externally toothed gear mounted frictionally tight on each said bushing and meshing with said internal ring gear secured to said post adjunct; a second externally toothed gear also mounted frictionally tight on each said bushing, and meshing with said sleeve's internal ring gear teeth; a shaft rotatably mounted in said gear cage in coaxial relationship therewith; a sun gear on said shaft so as to rotate therewith and so as to mesh with each of said first externally toothed gears; a housing supported for rotation on said post adjunct, said housing having a gun yoke adapted to support the gun; a housing cap substantially enclosing said sleeve; clutch means carried by said housing cap and selectively operable to engage and disengage said rotatable sleeve; means for operating said clutch means; a handwheel on said gear cage for causing rotation thereof; a knob on said shaft for causing rotation thereof; whereby, when said clutch is disengaged, said housing is freely rotatable about said post, post adjunct, sleeve, and gear cage by imparting a turning motion directly to the housing, thus allowing the gun to be adjustably positioned in an imaginary reference plane; and whereby, when said clutch is engaged, said housing optionally can be caused similarly to rotate about said post and said post adjunct by rotation of said gear cage through the agency of said handwheel and by rotation of said shaft through the agency of said knob.

7. The mechanism of claim 6 in which the clutch means is additionally provided with a clutch operating lever for selectively engaging and disengaging that clutch means and the sleeve; a retaining ring in the post adjunct for holding the sleeve against axial displacement; and a clamp ring on one end of said housing for holding the housing on said post adjunct.

8. A mechanism for adjustably positioning a gun in an imaginary reference plane, such mechanism comprising: a fixed pillow block having internal ring gear teeth formed therein; a spindle rotatably supported coaxially in said pillow block and adapted to carry the gun, said spindle also having internal ring gear teeth formed therein so as to be axially aligned with and juxtaposed to said pillow block's internal ring gear teeth; a spider extending between and rotatably supported by said pillow block and said spindle on an axis common thereto; an externally toothed gear carried by said spider and rotatable therein upon an axis parallel, but eccentric, to the common axis of said pillow block's and said spindle's respective internal ring gear teeth, said externally toothed gear being in mesh with the pillow-block's and with the spindle's internal ring gear teeth; whereby, upon selective rotation of said spider, said spindle will be caused to rotate within said pillow block, thus adjustably positioning the gun in an imaginary reference plane.

9. The mechanism of claim 8 additionally provided with a means for rotating the spider.

10. The mechanism of claim 8 additionally provided with a support means for the pillow block.

11. A mechanism for adjustably positioning a gun in an imaginary reference plane, such mechanism comprising: a first pillow block having internal ring gear teeth formed therein; support means for said first pillow block; a second pillow block secured to said support means in axial alignment with but spaced from said first pillow block; a spindle rotatably supported between said first and said second pillow blocks and adapted to carry the gun, said spindle also having internal ring gear teeth formed therein so as to be axially aligned with and juxtaposed to said first pillow block's internal ring gear teeth; a spider extending between and rotatably supported by said first pillow block and said spindle on an axis common thereto; an externally toothed gear carried by said spider and rotatable therein upon an axis parallel, but eccentric, to the common axis of said first pillow block's and said spindle's respective internal ring gear teeth, said externally toothed gear being in mesh with the pillow block's and with the spindle's internal ring gear teeth; and a handwheel for rotating said spider; whereby, upon selective rotation of said spider, said spindle is caused to rotate and thus effect positioning of the gun in an imaginary reference plane.

12. A mechanism for adjustably positioning a gun in an imaginary reference plane, such mechanism comprising: a first pillow block having internal ring gear teeth formed therein; support means for said first pillow block; a second pillow block secured to said support means in axial alignment with but spaced from said first pillow block; a spindle rotatably supported between said first and second pillow blocks and adapted to carry the gun, said spindle also having internal ring gear teeth formed therein so as to be axially aligned with and juxtaposed to said first pillow block's internal ring gear teeth; a spider extending between and rotatably supported by said first pillow block and said spindle on an axis common thereto; an externally toothed gear carried by said spider and rotatable therein upon an axis parallel, but eccentric, to said pillow block's and said spindle's respective coaxial internal ring gear teeth, said externally toothed gear being in mesh with the pillow block's and with the spindle's internal ring gear teeth; a handwheel for rotating said spider; and a shaft in axial alignment with said spider and rotatable with reference thereto, said shaft having external gear teeth formed therein and in engagement with said externally toothed gear; whereby the gun is adjustably positioned in an imaginary reference plane optionally by rotation of said spider through the agency of said handwheel, and also by rotation of said shaft.

13. The mechanism of claim 12 additionally provided with a means for rotating the shaft.

14. A mechanism for adjustably positioning a gun in an imaginary reference plane, such mechanism comprising: a first pillow block having internal ring gear teeth formed therein; support means for said first pillow block; a second pillow block secured to said support means in axial alignment with but spaced from said first pillow block; a spindle rotatably supported between said first and said second pillow blocks, said spindle also having internal ring gear teeth formed therein so as to be axially aligned with and juxtaposed to said first pillow block's internal ring gear teeth; a gun ring secured to said spindle so as to rotate therewith, said gun ring being adapted to carry the gun; a spider extending between and rotatably supported by said first pillow block and said spindle on an axis common thereto; an externally toothed gear carried by said spider and rotatable therein upon an axis parallel, but eccentric, to said pillow block's and said spindle's respective coaxial internal ring gear teeth, said externally toothed gear being in mesh with the pillow block's and with the spindle's internal ring gear teeth; a handwheel for rotating said spider; a shaft in axial alignment with said spider and rotatable with reference thereto, said shaft having external gear teeth formed therein and in engagement with said externally toothed gear; and a knob for rotating said shaft; whereby the gun is adjustably positioned in an imaginary reference plane in one of the two following manners: first, by rotation of said spider through agency of said handwheel, and second, by rotation of said shaft through agency of said knob.

15. The mechanism of claim 14 in which the first pillow block is constructed of two parts, one of which is a cover plate secured to the other part so as substantially to close the opening therein, said cover plate having the first pillow block's internal ring gear teeth.

References Cited in the file of this patent

UNITED STATES PATENTS

| | | |
|---|---|---|
| 1,639,846 | Green | Aug. 23, 1927 |
| 1,821,521 | Mackine | Sept. 1, 1931 |
| 1,856,987 | Elsea | May 3, 1932 |
| 2,223,891 | Krum | Dec. 3, 1940 |
| 2,368,191 | Berg | Jan. 30, 1945 |
| 2,457,824 | Kochevar | Jan. 4, 1949 |
| 2,459,159 | Glassman | Jan. 18, 1949 |
| 2,475,089 | Green et al. | July 5, 1949 |
| 2,499,497 | Gross | Mar. 7, 1950 |
| 2,575,805 | Glassey | Nov. 20, 1951 |

FOREIGN PATENTS

| | | |
|---|---|---|
| 326,874 | Germany | Oct. 12, 1920 |
| 329,997 | Germany | Dec. 2, 1920 |